Jan. 1, 1963   J. H. HAHN ET AL   3,071,236
ARTICLE CONVEYING, SEPARATING, AND STACKING APPARATUS
Original Filed Aug. 23, 1957   17 Sheets-Sheet 2
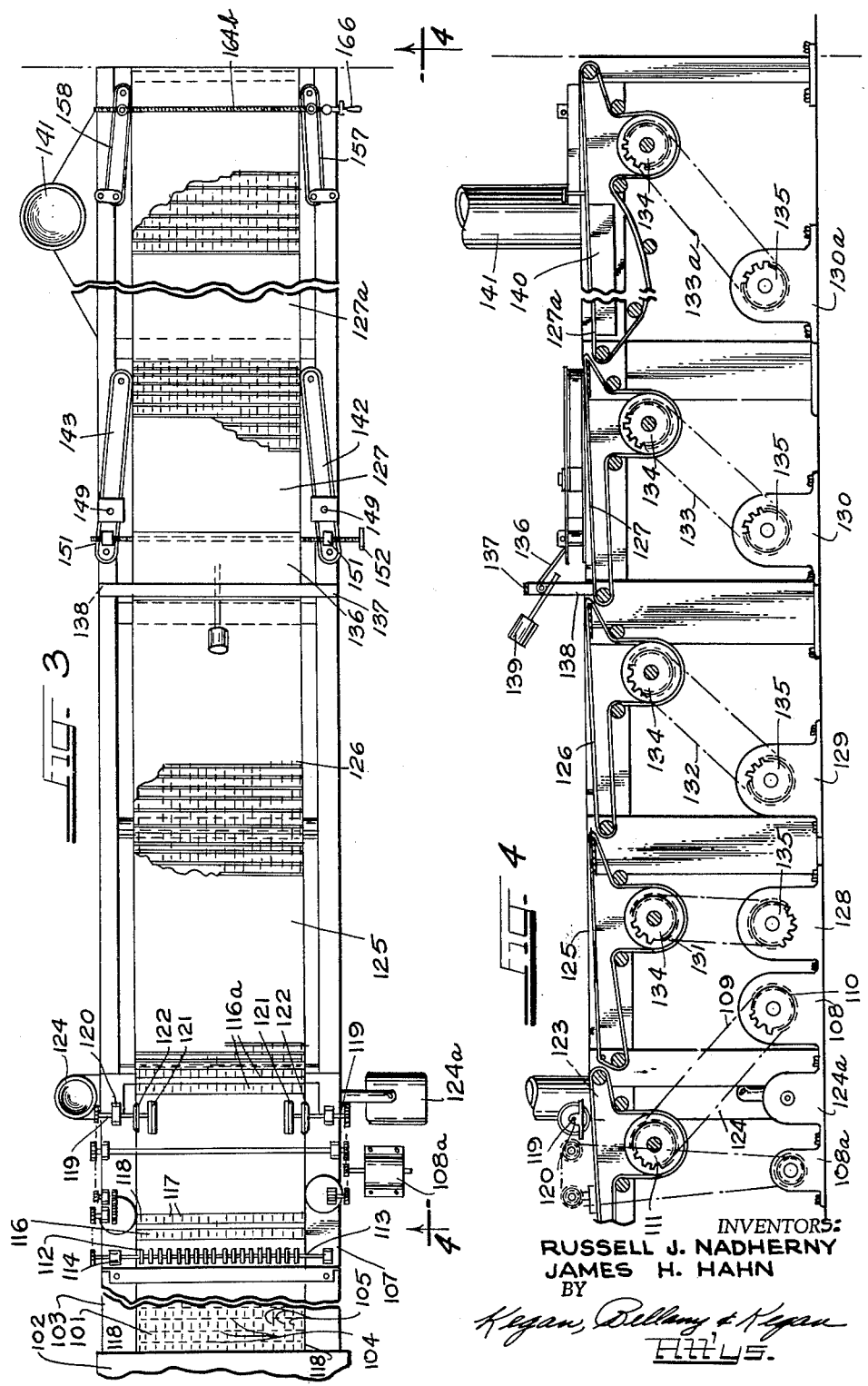
INVENTORS:
RUSSELL J. NADHERNY
JAMES H. HAHN
BY

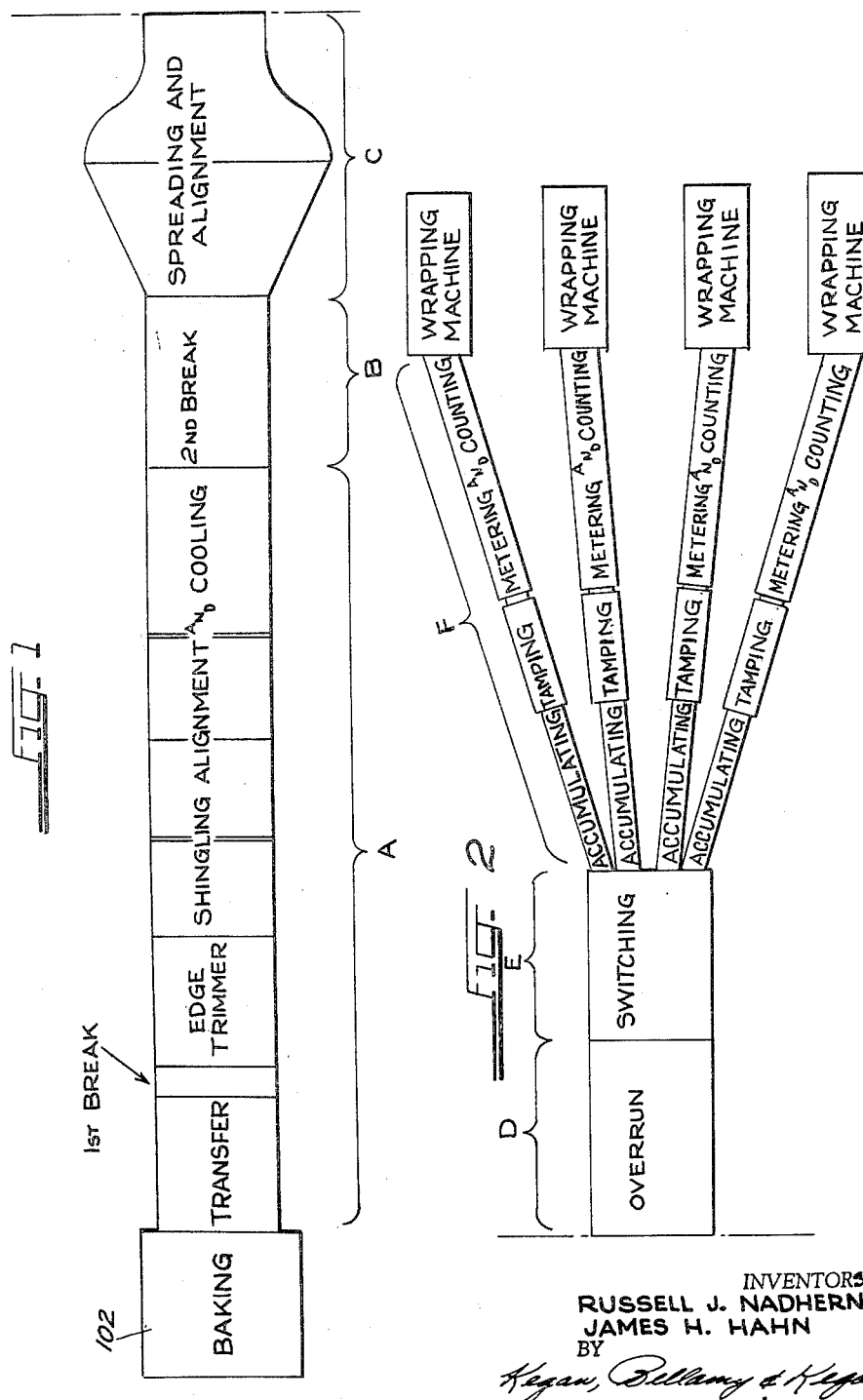

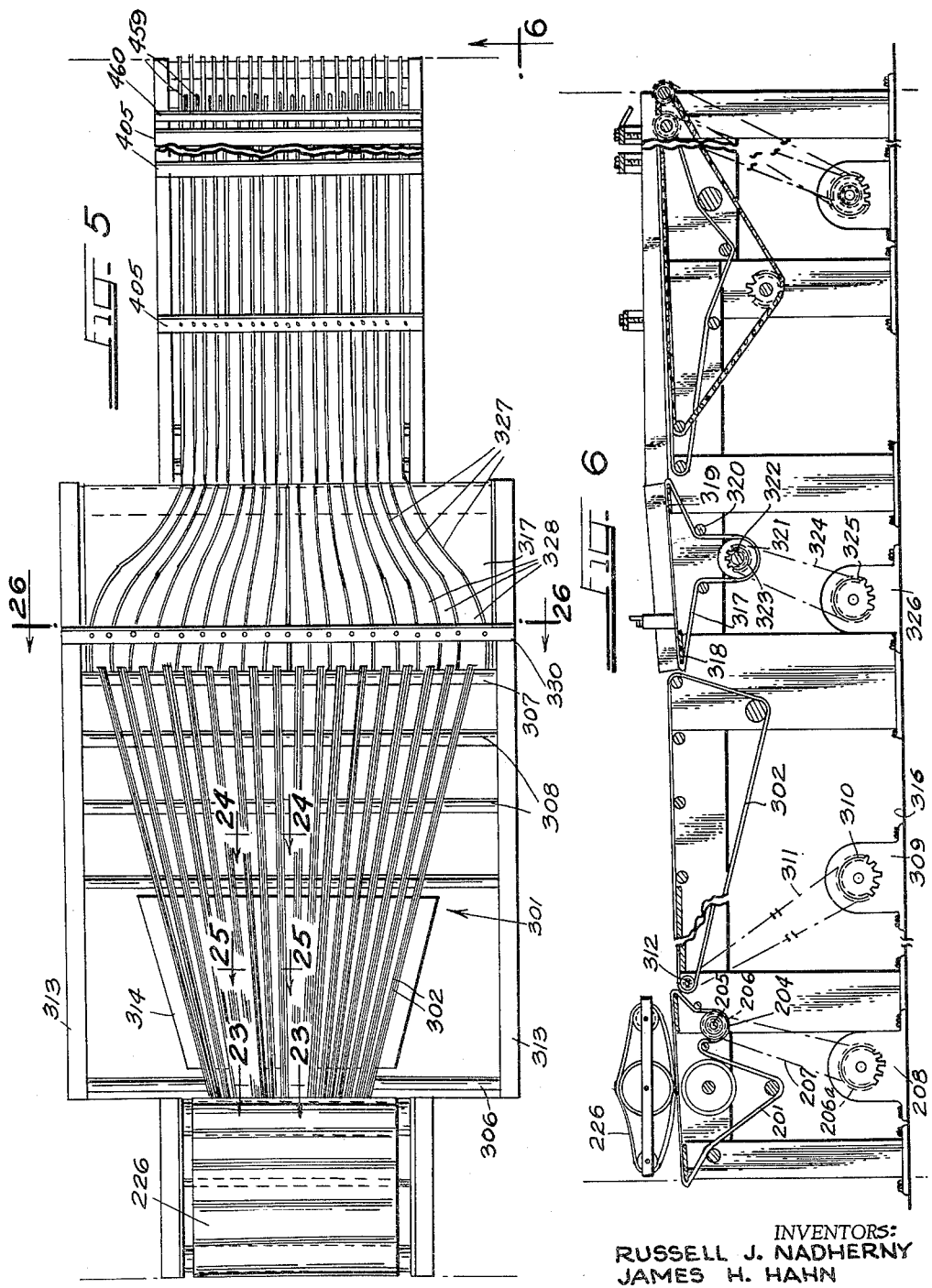

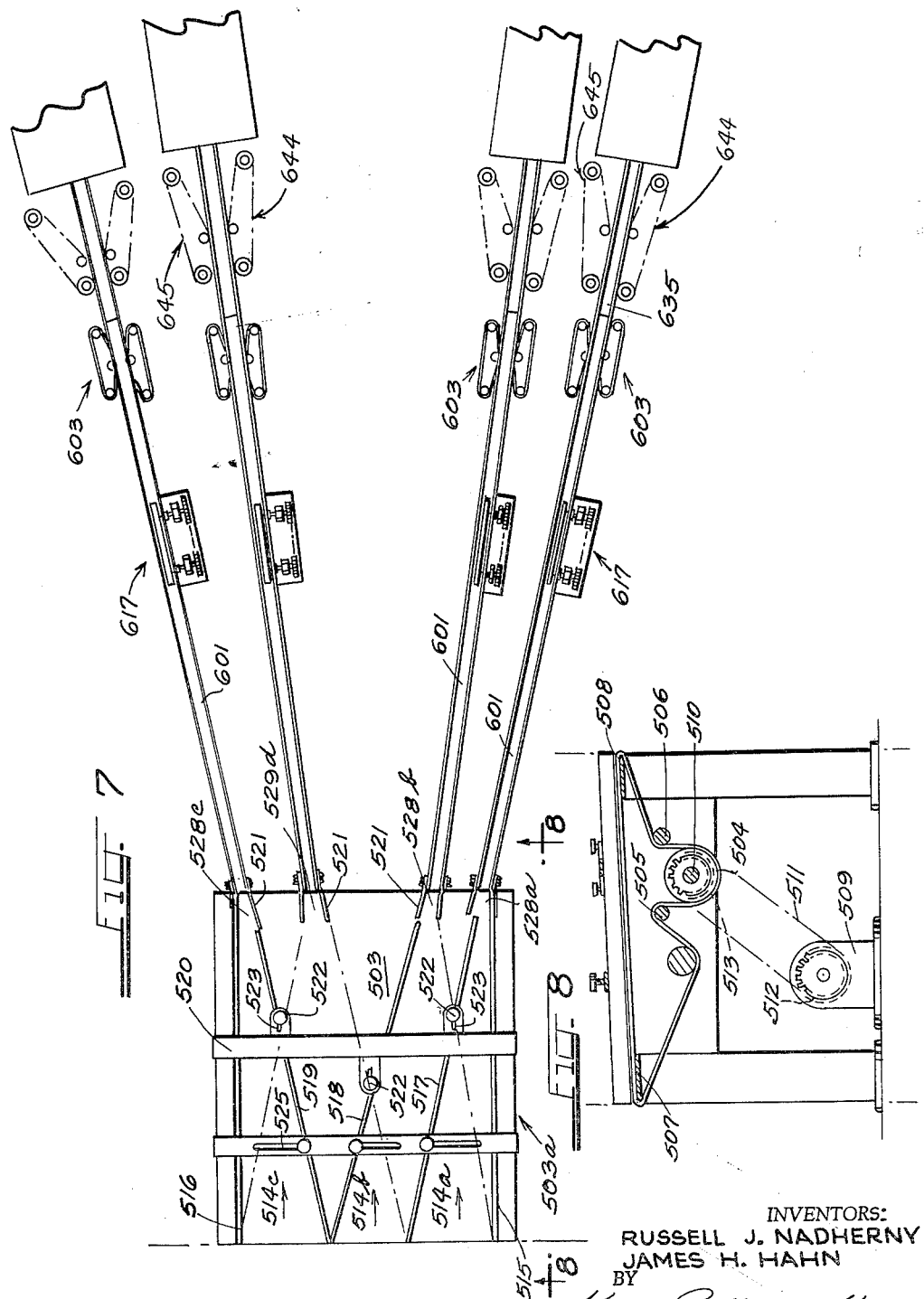

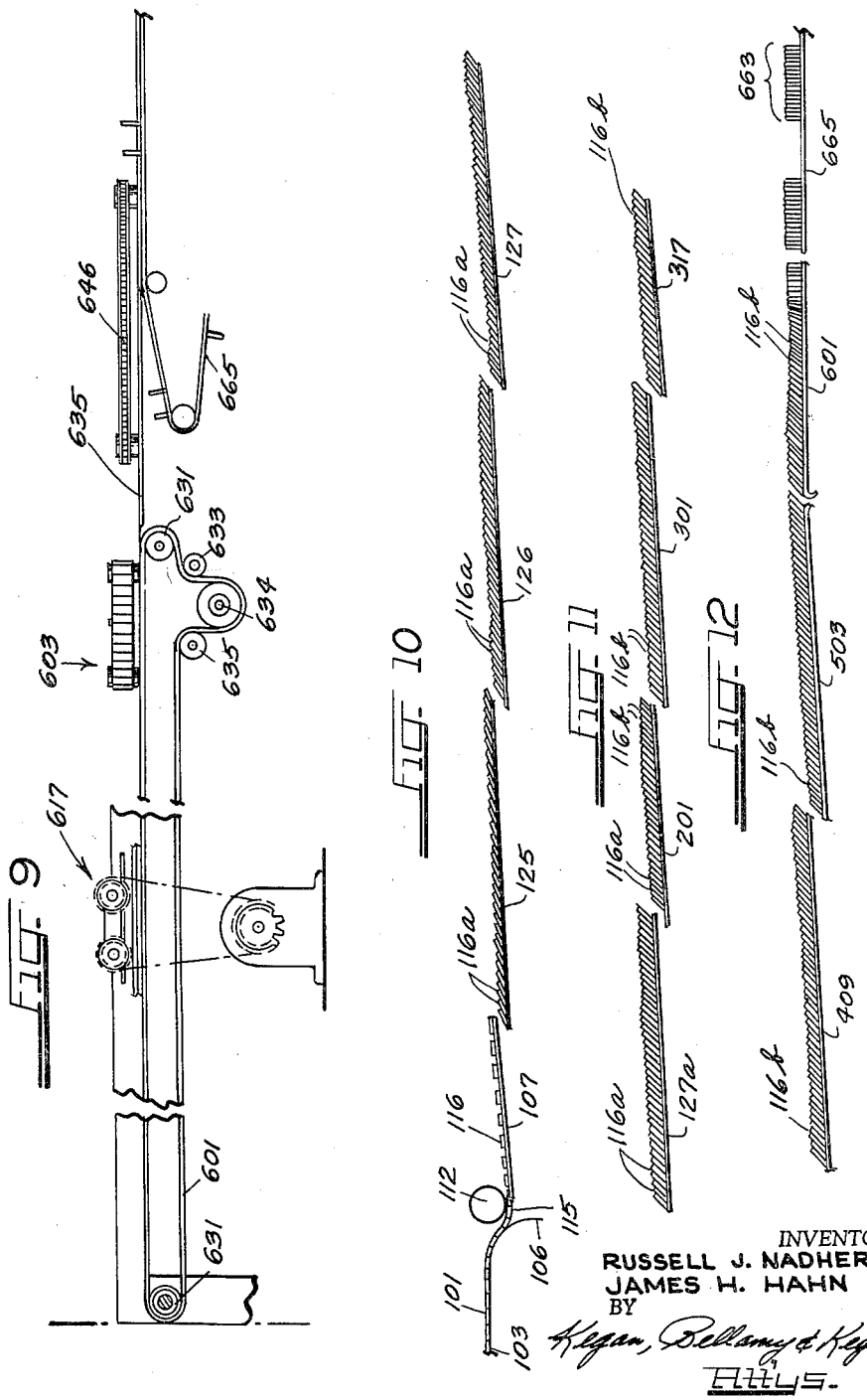

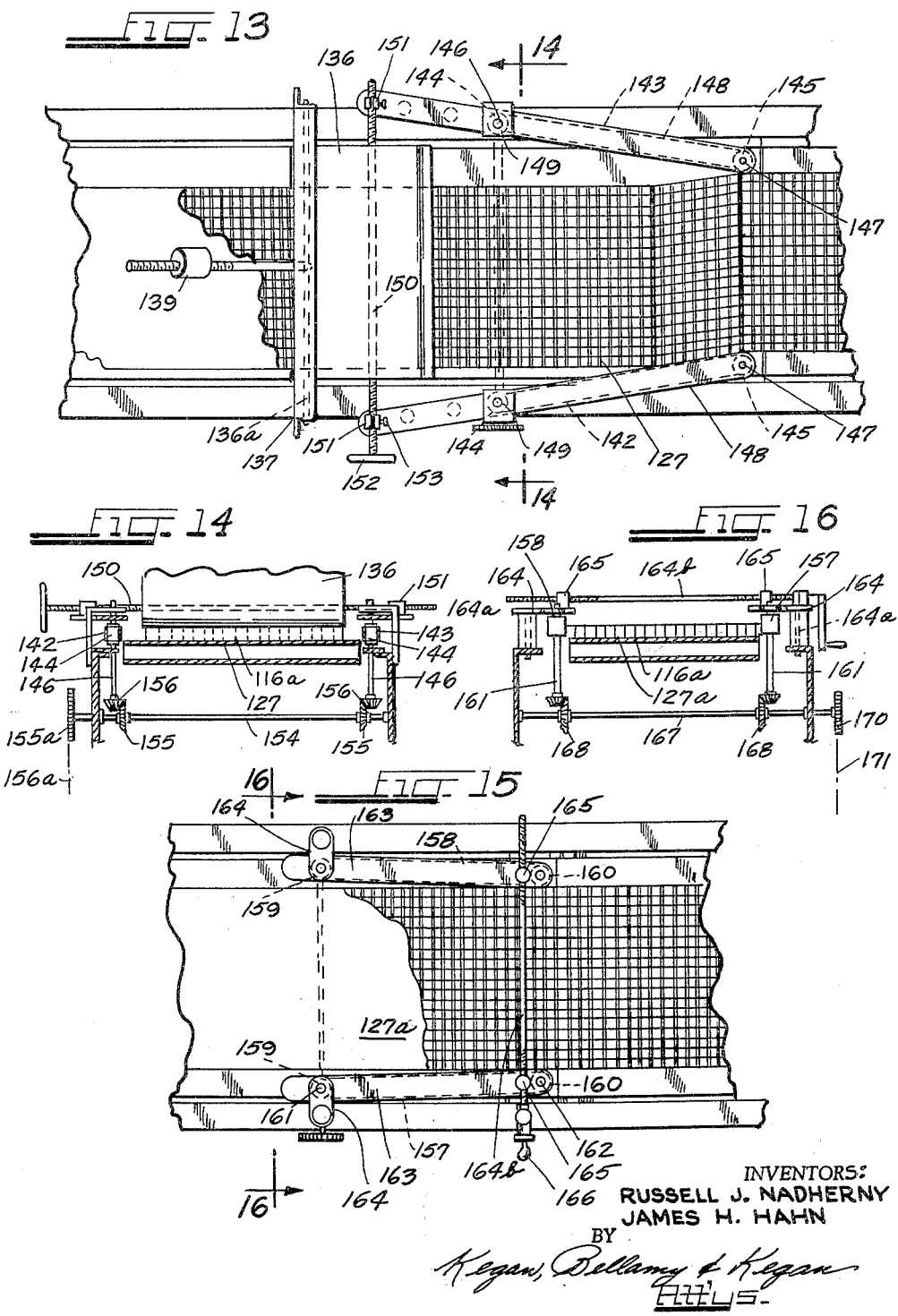

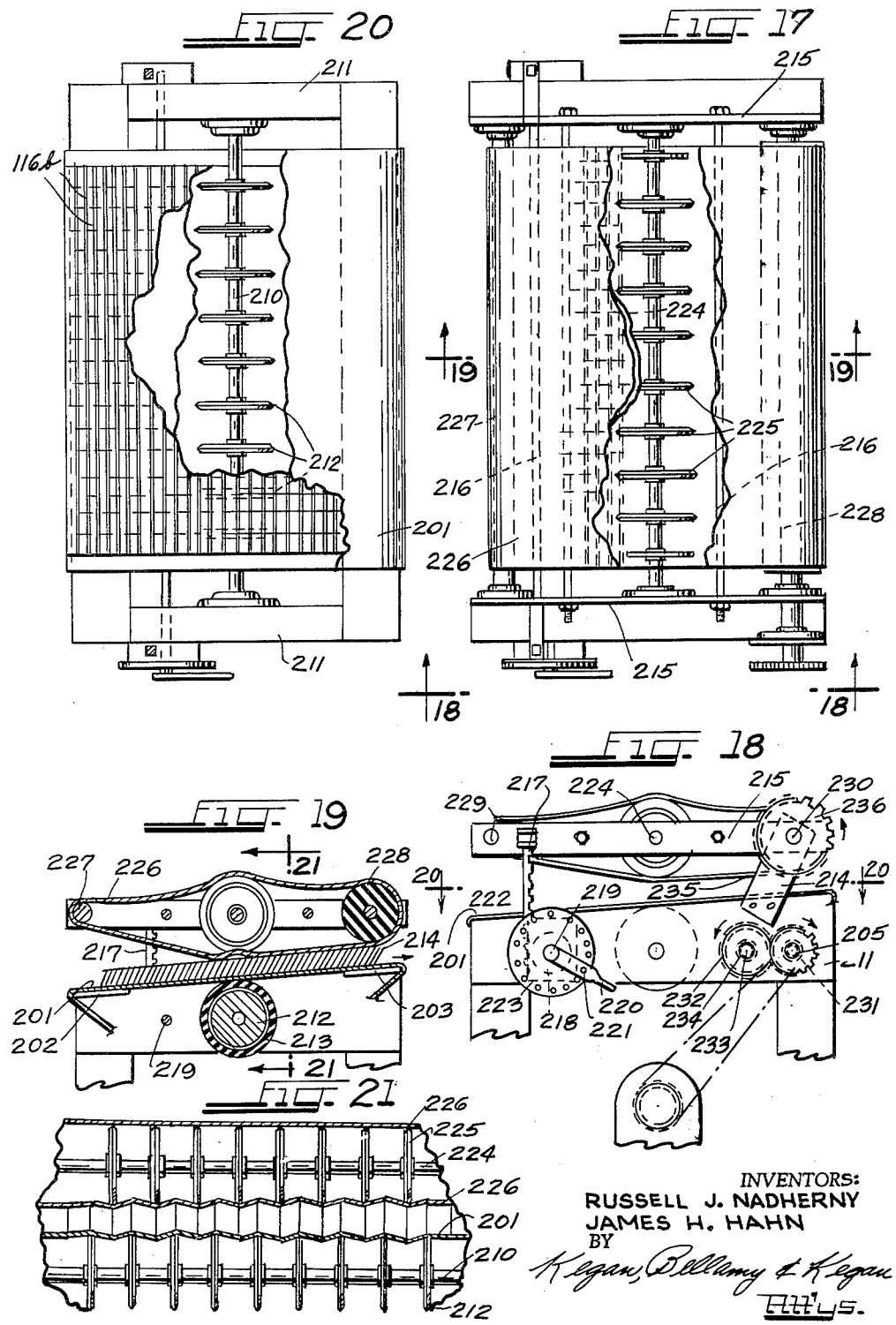

Jan. 1, 1963 J. H. HAHN ET AL 3,071,236
ARTICLE CONVEYING, SEPARATING, AND STACKING APPARATUS
Original Filed Aug. 23, 1957 17 Sheets-Sheet 8
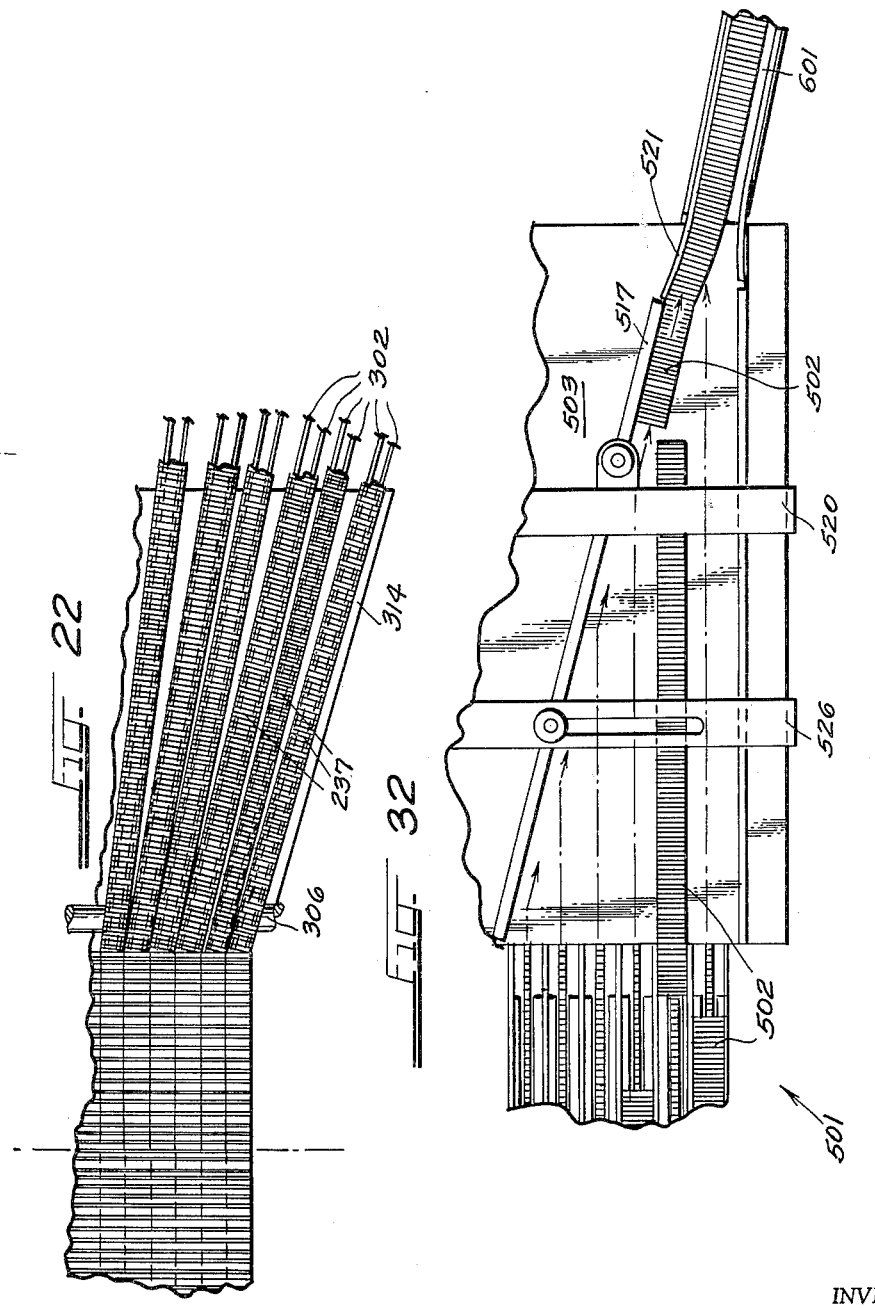
INVENTORS:
RUSSELL J. NADHERNY
JAMES H. HAHN
BY

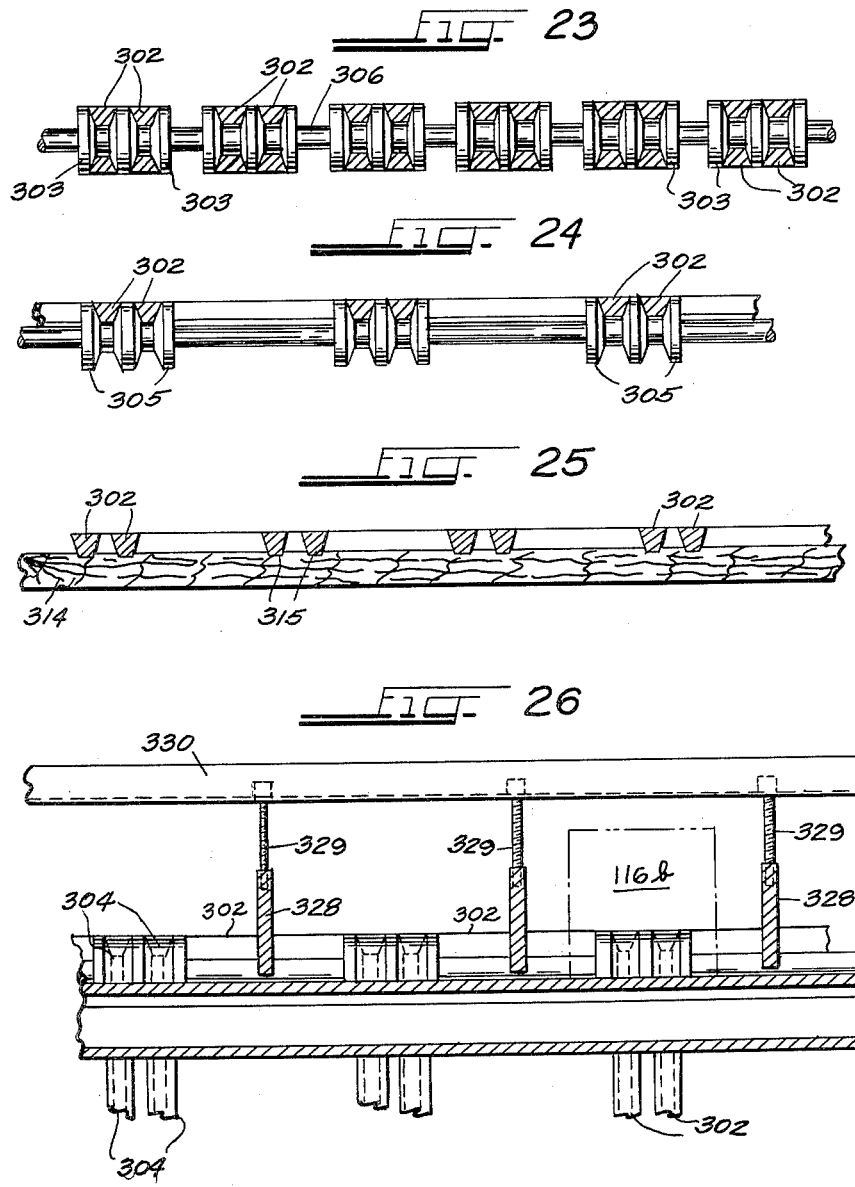

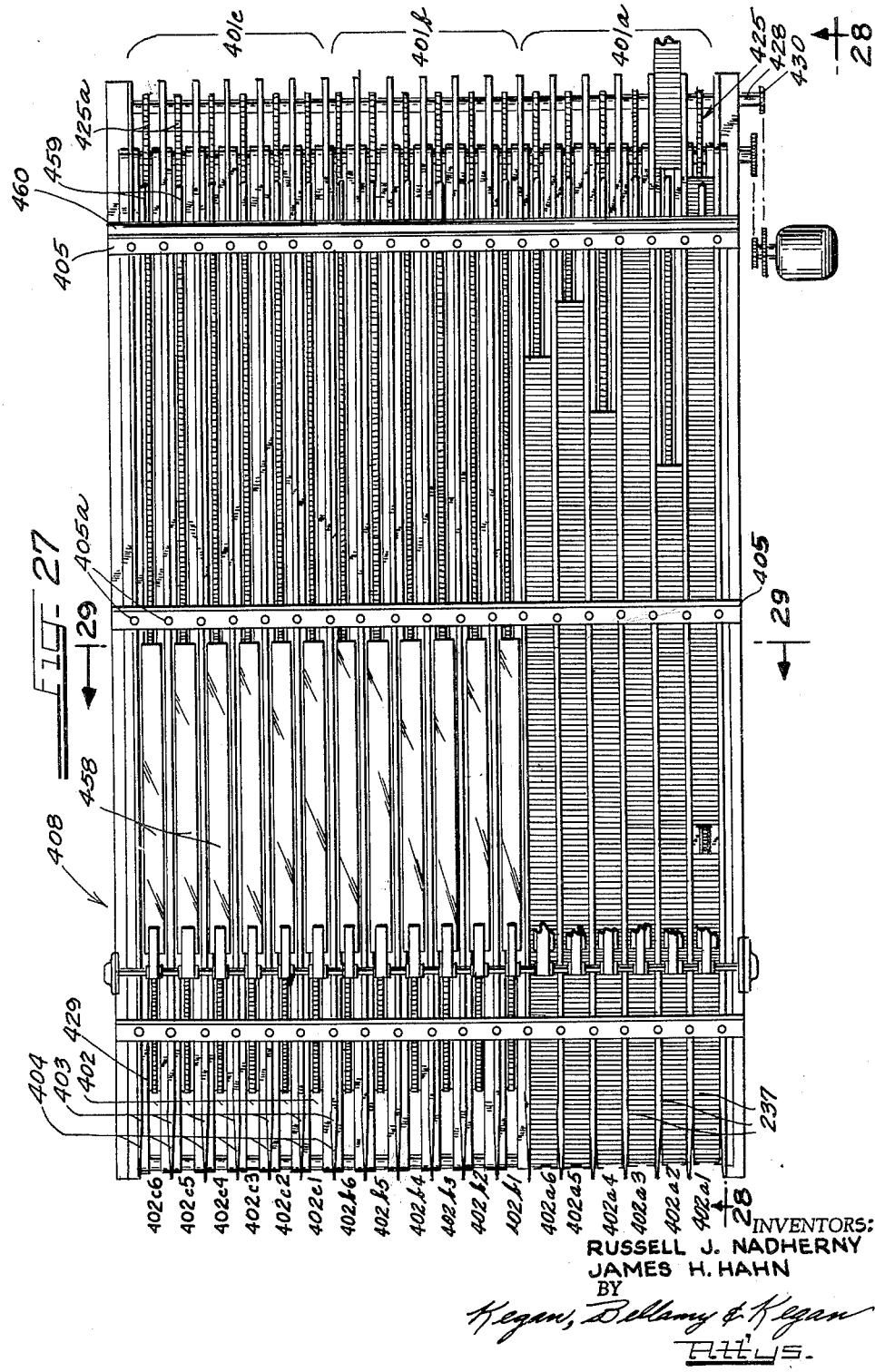

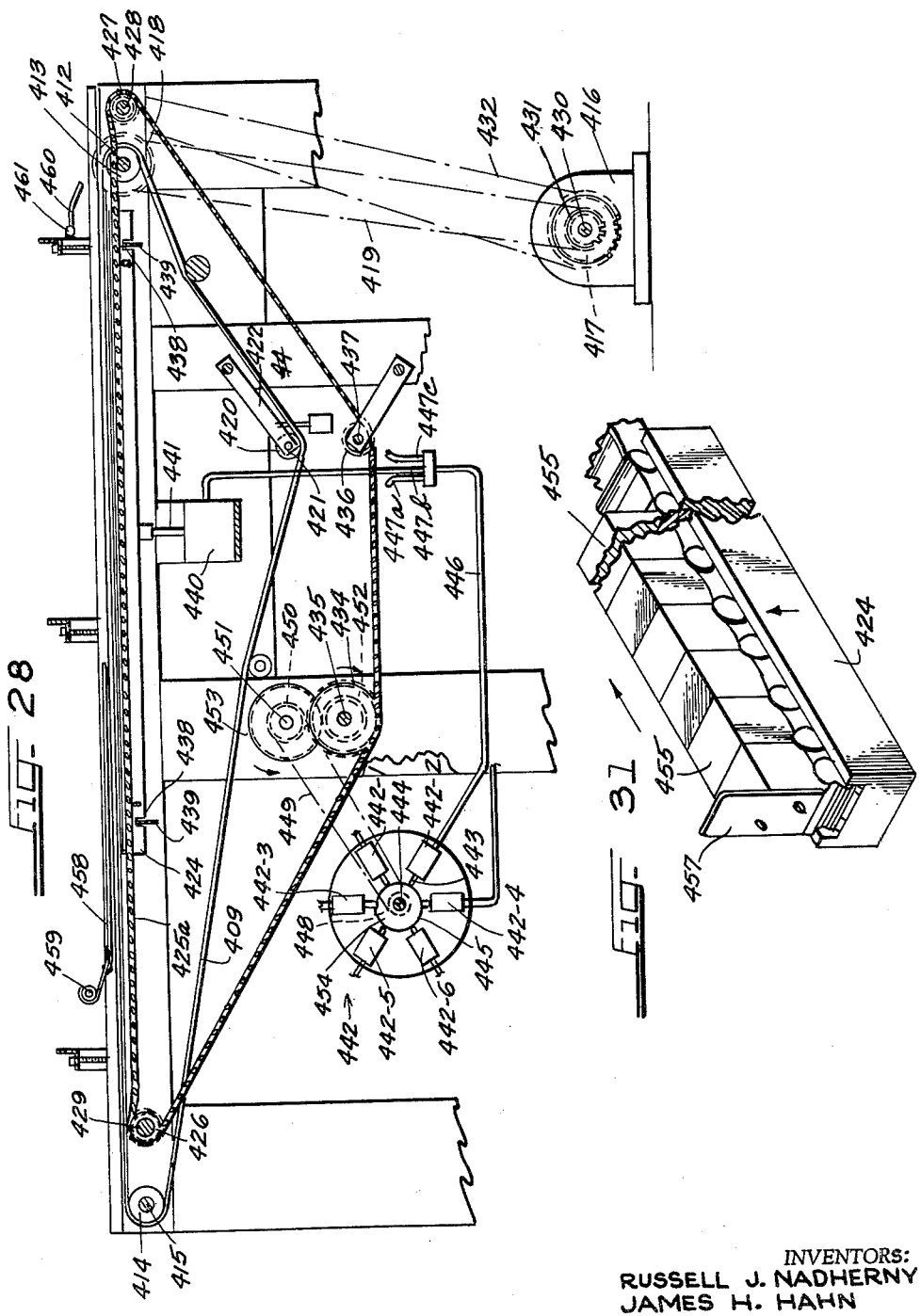

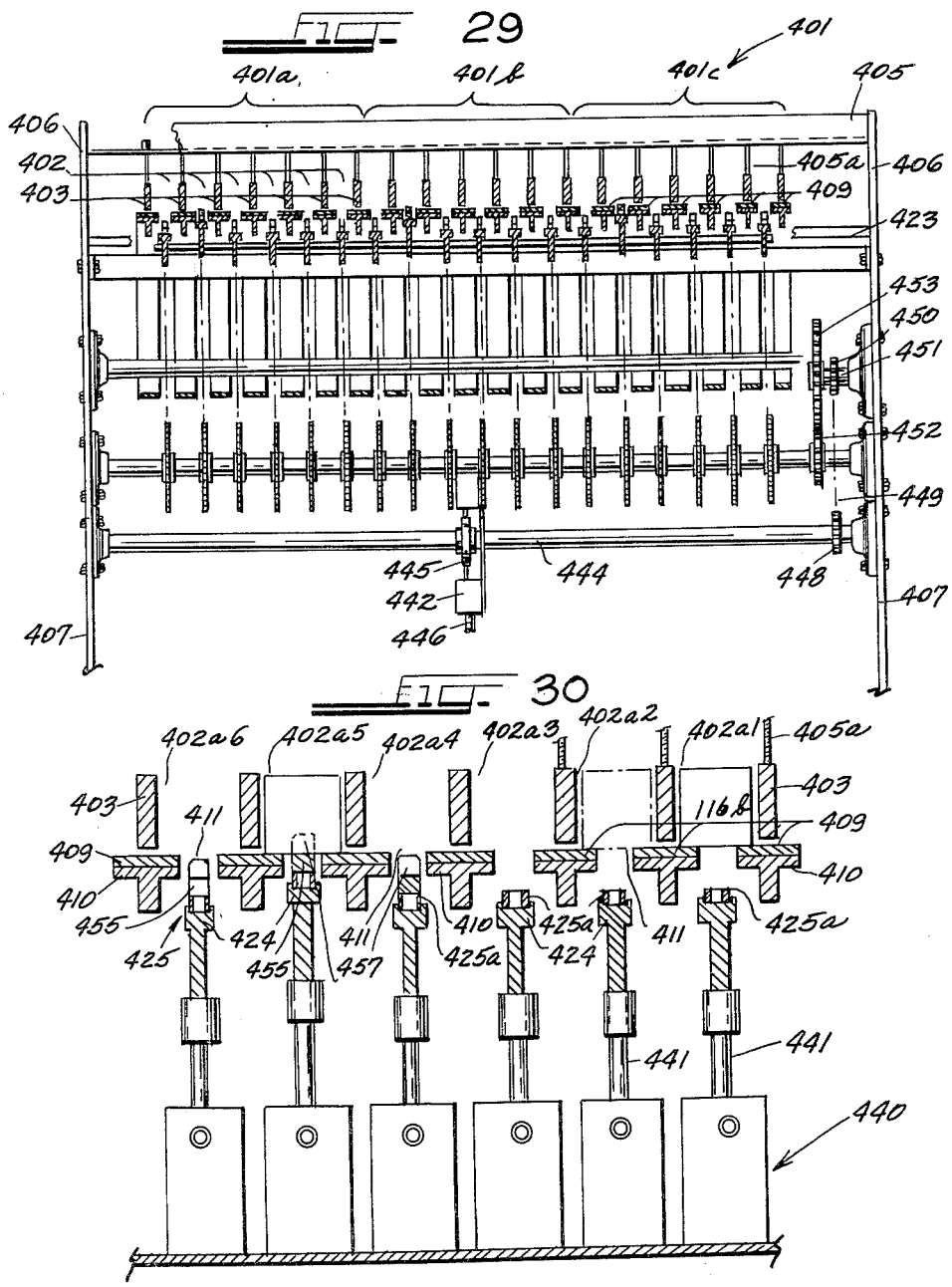

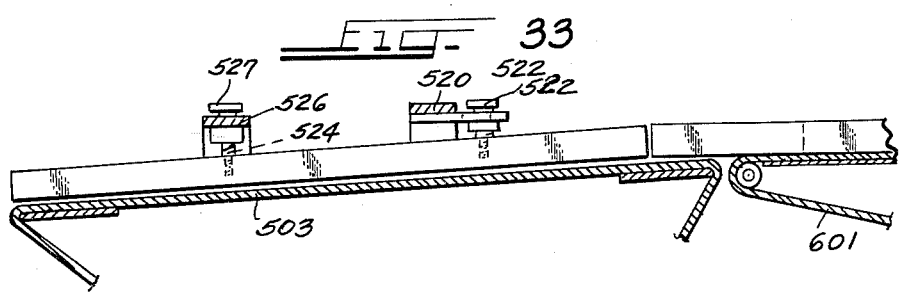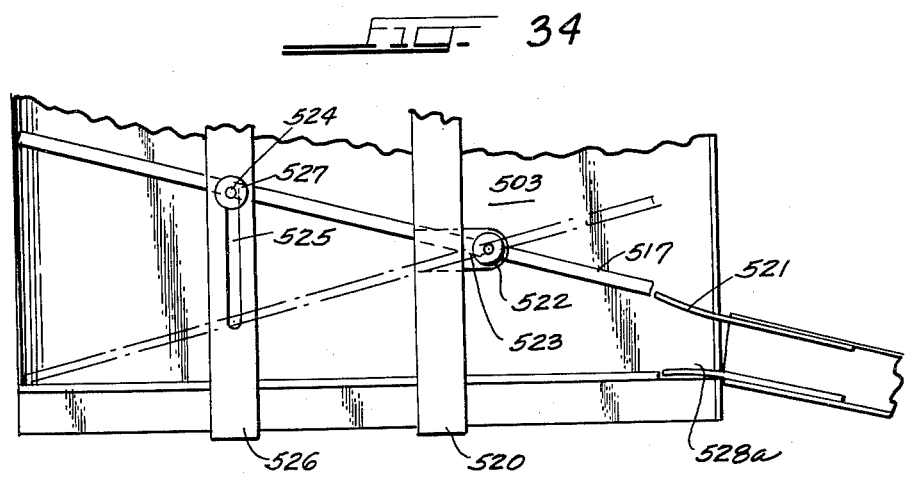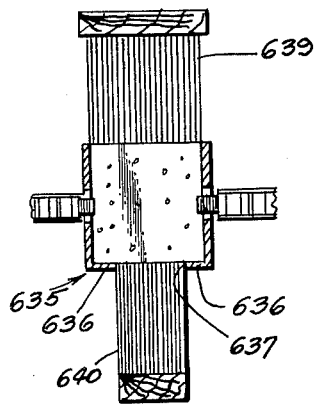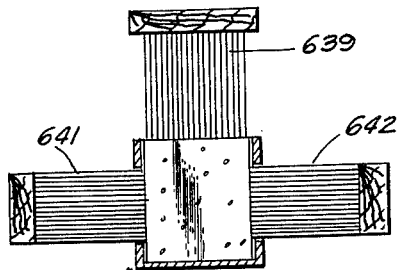

Jan. 1, 1963  J. H. HAHN ET AL  3,071,236
ARTICLE CONVEYING, SEPARATING, AND STACKING APPARATUS
Original Filed Aug. 23, 1957  17 Sheets-Sheet 14
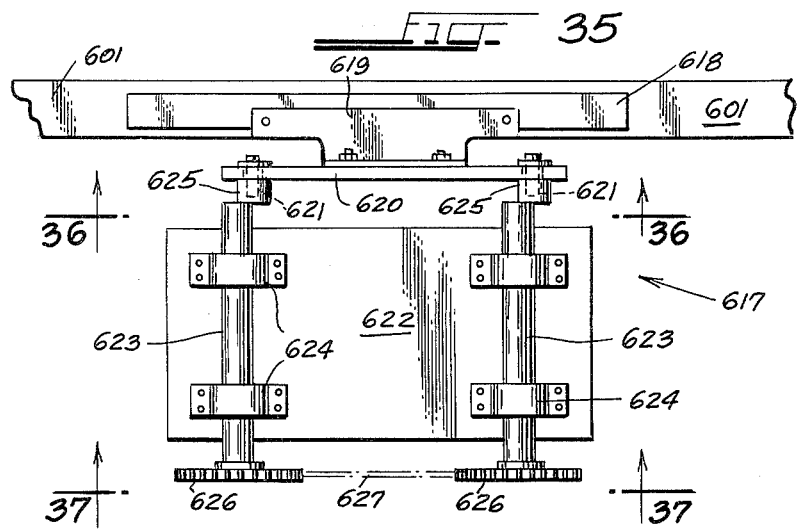
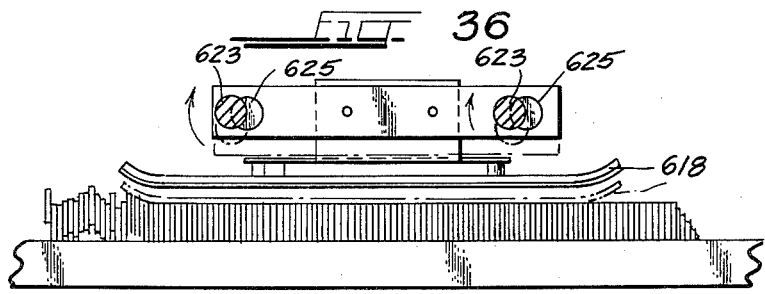
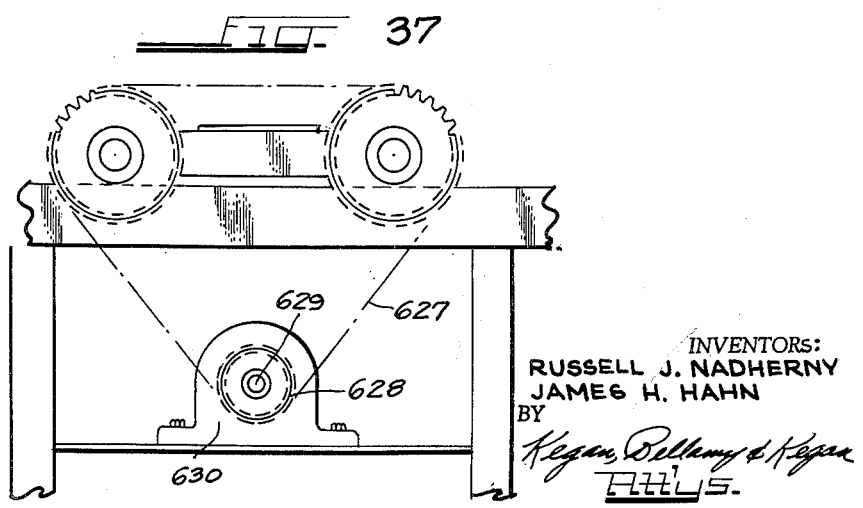
INVENTORS:
RUSSELL J. NADHERNY
JAMES H. HAHN

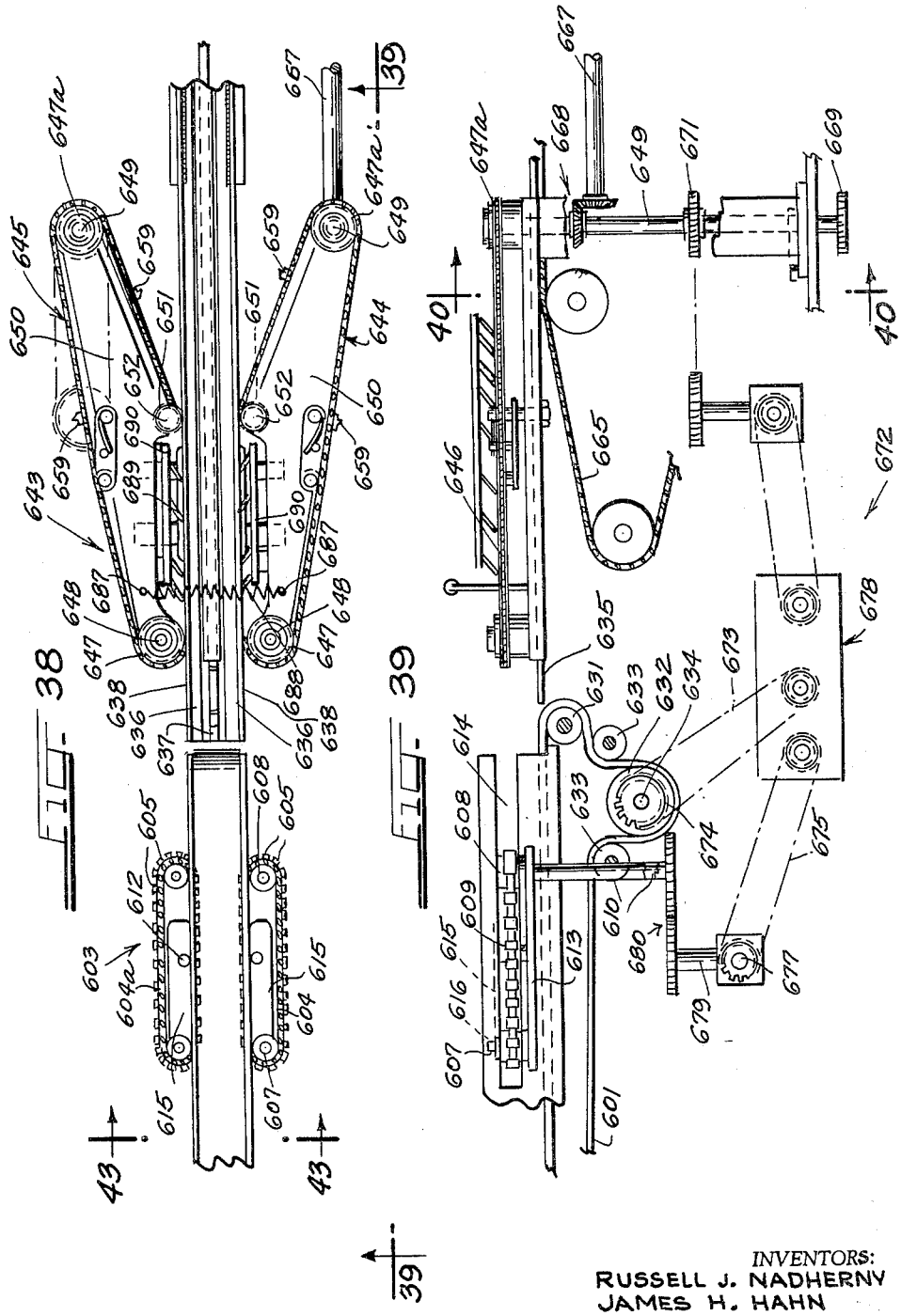

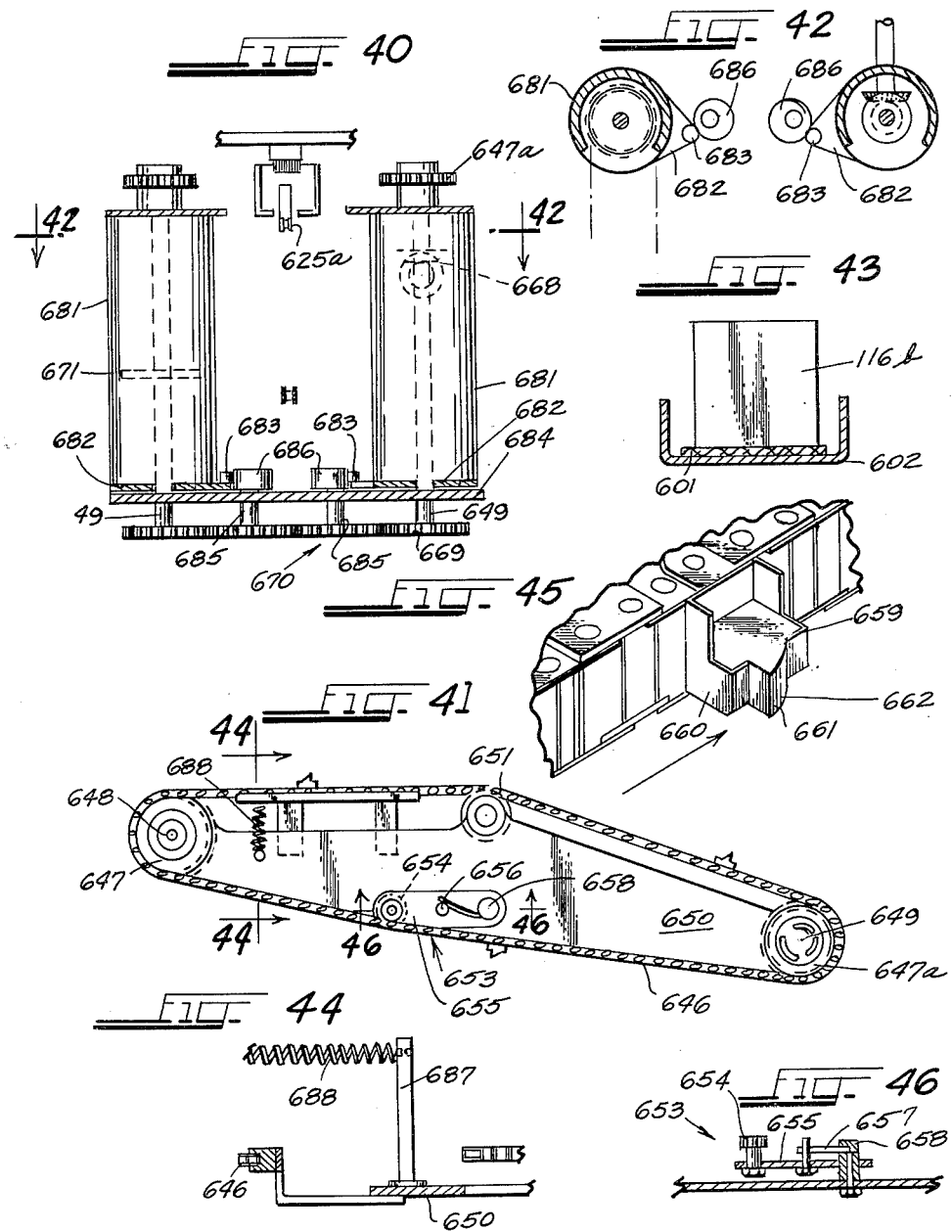

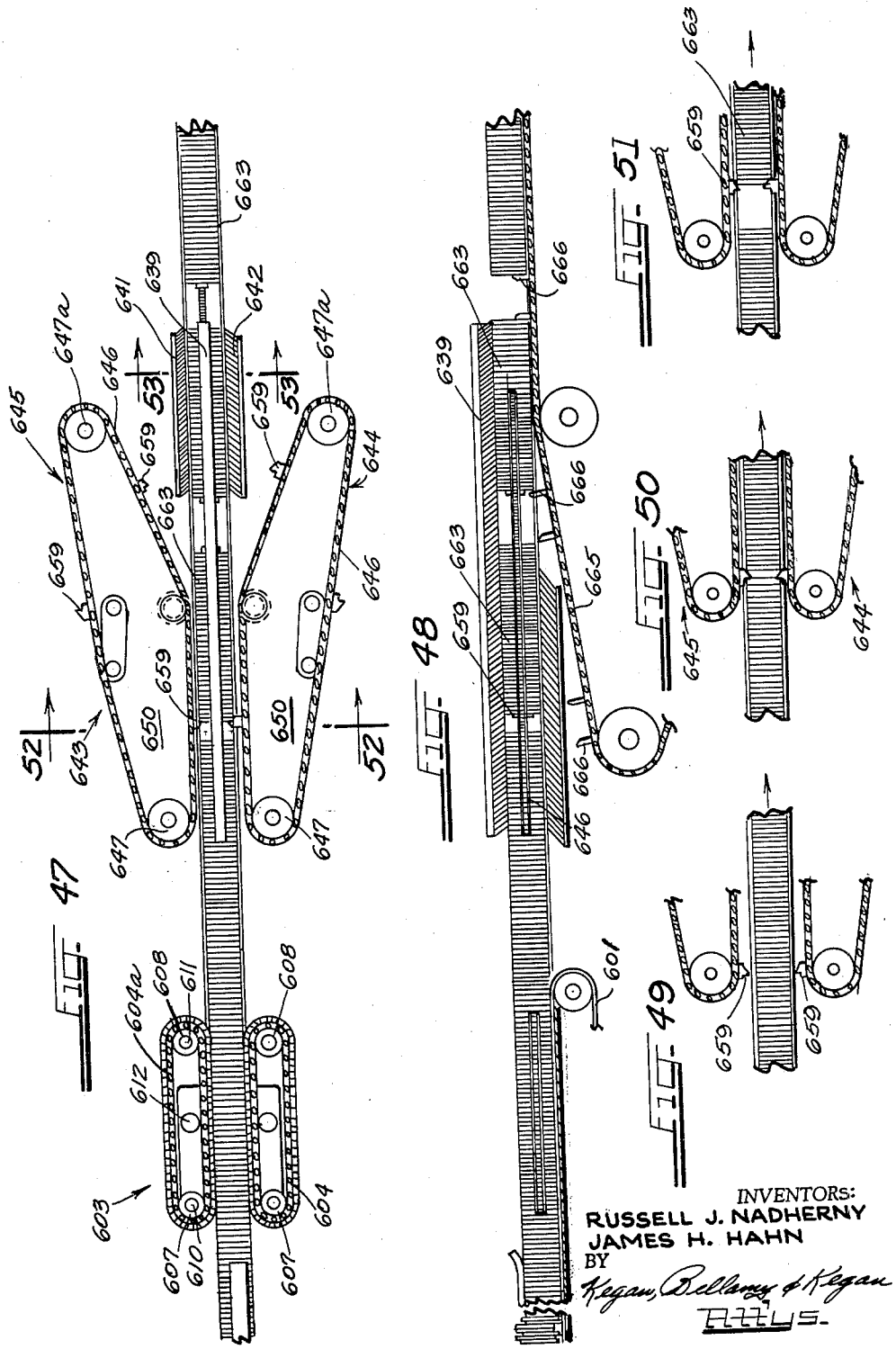

United States Patent Office 3,071,236
Patented Jan. 1, 1963

3,071,236
ARTICLE CONVEYING, SEPARATING, AND STACKING APPARATUS
James H. Hahn, Glenview, and Russell J. Nadherny, Wilmette, Ill., assignors to Schulze and Burch Biscuit Co., Chicago, Ill., a corporation of Illinois
Continuation of abandoned application Ser. No. 679,991, Aug. 23, 1957. This application Aug. 29, 1960, Ser. No. 53,590
33 Claims. (Cl. 198—32)

This is a continuation of the present inventors' application, Serial No. 679,991, now abandoned, filed August 23, 1957.

This invention relates to a self-contained and fully automatic system for performing on bakery products all operations required between the baking oven and wrapping apparatus. The invention is particularly adapted for use on crackers baked in a continuous line baking oven and issued therefrom as continuous scored sheets, or as a series of platoon-like sections. The sheets and platoons include long strips moved broadside ahead and divided into cracker panels or divisions by means of the scoring. The herein apparatus performs the operations of breaking the platoons and sheets into strips of the desired unit width, conveying and shingling the strips, breaking the strips into the desired unit size, aligning each of the plurality of rows of units so formed, consolidating the rows into a lesser number thereof for feed to wrapping apparatus, and automatically picking off and feeding a predetermined number of cracker units for each wrapping operation.

The handling and packaging of frangible bakery products, such as soda crackers, has received much attention in recent years. A wide variety of apparatus has been developed in an effort to separate, count and deliver a predetermined number of the baked products in an efficient manner. For example, by far a major portion of the soda crackers currently available is produced from sheets of dough suitably embossed or scored, and which occupy the greater part of the width of an endless band conveyor traveling through an oven of the continuous discharge type. In its direction of travel the scored sheet may be continuous, it may be fed into the oven as a series of spaced platoon-like sections, or it may issue from the oven as a series of spaced sheet sections of variable length as a result of the lengthwise shrinkage occurring in the sheet during baking.

The baked product initially is cooled during its travel from the oven and then is broken into the desired unit size for packaging. That is, it may be broken into units comprising, for example, one, two or four cracker panels. The breaking operation may be accomplished mechanically, in which case the product, more often than not, is subjected to forces which cause a great deal of crumbling and waste; or, the breaking may be done entirely by hand. The latter, of course, has proved far too slow and expensive, besides being contrary to desired sanitary practices.

After the units are broken to the desired size, it has become the more usual practice to gather and remove them by hand (again posing a problem of maintaining the product strictly sanitary) to vertically extending channel ways from where they are fed in predetermined amounts to packaging machinery. More intricate and elaborate systems also have been devised to automatically gather, stack and feed the crackers. None, however, has proved very successful due to the dimensional variances inherent in the crackers, and further due to the numerous mechanical breakdowns experienced, the frequent occurrences of cracker jamming, breakage, etc., necessitating operational shut-downs to repair the equipment or to re-arrange the crackers correctly for proper travel and handling. Moreover, in nearly all of the known equipment for handling crackers, a high percentage of waste results from the undesirable forces to which the crackers are subjected.

In all of the known wide variety of apparatus employed for separating, delivering, or counting predetermined numbers of cracker units for packaging, the frequent mechanical and operational delays, and the use of hand labor in conjunction therewith, is wholly inconsistent with the high rate at which baked crackers inexorably issue from the baking oven.

Thus, any automatic system which affords a practical and economical means for preparing crackers for packaging must be capable of assuredly handling large quantities in a rapid and highly efficient manner. In addition, the system must be completely accurate and capable of handling the crackers without causing appreciable breakage and waste, since the oven-fresh crackers when cooled will be very brittle, and hence not able to withstand rough handling.

The present invention provides an automatic system which meets and fulfills all these requirements, while operating for the intended purpose in a highly satisfactory and efficient manner. The system further may be used with other bakery products, such as graham crackers, Ry-Krisp, cookies, etc., as well as also being capable of handling widely different types of articles, such as floor tiles, shingles, and candy bars. In view of the immediate commercial demand therefor, however, the embodiments of the present invention herein disclosed are particularly adopted for handling soda crackers.

The principal objects of this invention is to provide automatic apparatus for receiving tablet-like articles, such as soda crackers, in bulk quantities and continuously delivering them in predetermined amounts in preparation for packaging.

An important object of this invention is to provide a fully automatic system for performing on crackers all operations required between and including the reception of the baked crackers in bulk and their delivery in segregated counted lots to wrapping apparatus, including cracker transfer, transformation to the desired size for packaging, and ultimate separation into groups of the desired weight and number.

Another important object of this invention is to provide cracker handling apparatus which receives bulk crackers in a plurality of rows, and transforms the crackers to a lesser number of rows, or even a single row, composed of cracker panels of the desired size and in readiness for further handling operations, such as, for example, wrapping or packaging. To this end the invention contemplates the provision of novel means whereby sheets of baked crackers, continuously delivered in sections moving broadside ahead and comprising a plurality of rows, are separated, selectively accelerated by rows and consolidated into a lesser number of rows, and thereafter segregated into lots of predetermined number prepared for packaging.

Another important feature of the invention is the provision of automatic means for receiving the bulk crackers in baked sheets of joined crackers, and thereafter separating the bulk into cracker panels of the desired unit size for wrapping or packaging without causing any appreciable cracker wastage or breakage.

Still another important feature of the present invention is the provision of automatic means for repetitively measuring off and separating groups of crackers from the foremost end of a continuously moving cracker lane. In this connection, the invention further contemplates the provision of means whereby slight variations in the cracker count of the segregated groups may be accomplished to compensate for volumetric and weight irregularities inherent in the crackers.

A specific object of the invention is to provide a novel automatic assembly capable of continuously separating scored cracker sheets or sections into desired cracker panel sizes, and maintaining and discharging the same in aligned arrangement for subsequent handling operations while keeping cracker waste at a minimum.

Another specific object of this invention is to provide apparatus arranged to receive continuously a plurality of moving cracker lanes, sequentially pick off sections from the leading ends of the lanes while contemporaneously accelerating the same, and consolidating the crackers into a single lane.

A further specific object of the present invention is to provide switching means whereby the crackers in a consolidated lane without production interruption may be selectively directed toward subsequent stand-by handling apparatus to permit repairs, cleaning, and the like, when necessary.

Other objects of this invention are to provide cracker handling apparatus: Which operates in a highly automatic, efficient and rapid manner capable of handling crackers produced under the most rapid of modern mass production methods; which gently handles the crackers without subjecting them to any undue forces, without breaking the blisters normally resulting in baking, or without scraping off the salt which may have been applied; and which marshals the crackers into desired dressed alignment to facilitate the several automatic handling operations, as well as facilitating cracker transfer therebetween.

The foregoing and other objects are fully met by a system capable of receiving the crackers issued from an oven in large, flat, embossed sheets. Standardized equipment is used up to the point of oven discharge. The crackers next are carried by a continuous belt conveyor to transverse break equipment which separates the crackers into strips of the desired size. In the herein embodiment, the sheet is broken into strips a single cracker panel deep, although, of course, strips two or more panels deep may be provided. The strips further move broad side ahead and comprise a plurality of crackers. For the purpose of the herein description, the strips, for example, may be eighteen crackers wide. This first breaker station includes a plurality of wheels commonly mounted to a rotating shaft, and positioned above the moving sheet of crackers so as to ride thereon. As the wheels ride on the moving sheets they cause breaks at the transverse scored lines, thereby separating the crackers into strips eighteen crackers wide. From the first breaker station the cracker strips move past a trimmer station whereat the brown edges at either end of the strip are removed. After the crackers leave the trimmer station, they pass onto a series of successively slower moving conveyors which causes the cracker strips to become shingled. Means further may be provided to facilitate cooling of the crackers as they are shingled. At the last of the shingling conveyors auxiliary alignment conveyors are provided at each side thereof for directing the feed of the shingled strips of crackers to the next breaker station.

At the hecond breaker station the strips of eighteen crackers each are broken into cracker units of the size desired to be wrapped. For example, as hereinafter illustrated, the strips are broken into units comprising single cracker panels. Large rubber wheels are alternately arranged above and below the conveyor carrying the crackers through the breaker station, the wheels being alingned with scored lines in the cracker strips. The purpose of the auxiliary conveyors, hereinabove mentioned, is to feed the shingled strips of crackers to the breaker wheels so that the cracker strip scored lines are aligned with these wheels. The second breaker station includes an arrangement using canvas belts, one of the belts carrying the crackers thereon, while a second belt travels above the moving crackers and between them and the breaker wheels mounted thereabove. Employment of the canvas belts above and below the crackers as they pass between the breaker wheels maintains the crackers in an orderly manner as they are broken, while preventing undue pressure from being applied to the crackers by the wheels which never touch the crackers.

The individual crackers leaving the second breaker station are ready to be separated into individually controlled lanes for ultimate measuring and handling, and feeding into the wrapping machines. Separation of the individual crackers is accomplished at a spreader station which fans the crackers out into eighteen rows of individual crackers and feeds them into aligned lanes which extend in close approximate parallel relationship with each other. Each lane includes spaced parallel running belts which carry the crackers down the lanes. Overrun conveyors, travelling faster than the speed of the belts, are provided at each lane. Normally these acceleration conveyors have no effect on the travelling crackers. However, by control mechanism these overrun conveyors are sequentially made effective to engage the crackers at their respective lane and move them at an accelerated speed. The lanes and their overrun conveyors are arranged in three highways, each comprising six lanes feeding crackers into switching apparatus which directs the crackers from each group of six lanes in single-line fashion towards a wrapping machine. All the while the crackers pass through the lanes, they are in shingled fashion similar to that on the shingling conveyors. Thus, the eighteen lanes of crackers issue from the overrun conveyors as three parades. The direction of cracker flow of these parades is controlled by the aforementioned switching apparatus which may direct the crackers towards any three of four wrapping machines. The fourth wrapping machine is employed as a standby unit which is available for immediate use in case of mechanical breakdown in any of the machines or when they are cleaned. In this manner the continuous flow of crackers may be handled even though one of the wrapping machines is not in use. Moreover, the switching apparatus is so arranged that the switching operation may be accomplished without loss of production or creation of scrap.

Before entering the wrapping units, the crackers are accumulated in a reservoir or section of conveyor in each highway leading into a particular wrapping machine. During the accumulation the crackers are caused to move to a near vertical position in preparation for feed to the wrapping machines.

Each of the highways leads to a respective wrapping machine. Before being fed to the wrapper, however, the crackers pass linear counting apparatus which measures off appropriate lengths of lots of crackers. This apparatus includes retarding conveyors which hold back cracker flow and measure the linear rate of feed of the crackers towards the wrapper. Appropriately positioned retarding and positioning brushes maintain the crackers in a vertically compact alignment in preparation for passing the counter mechanism. The counting apparatus further includes a pair of synchronized conveyors at each side of each highway, the synchronized conveyors being so arranged as to be able to pick off the crackers for ultimate feed to the wrapping machines. Each of the synchronized conveyors carries means arranged to engage the side of the vertically standing compact backlog of crackers and control the feed thereof to the wrapping machine. In one illustrated embodiment, the speed of the synchronized conveyors is synchronized to the speed of a conveyor within the wrapping machine and is faster than the rate of cracker feed thereto so that the crackers are engaged and accelerated to the speed of the wrapping machine conveyor. The wrapping machine is arranged to receive the measured crackers and pass them therethrough.

The retarding conveyors are capable of varying the number of crackers which are ultimately wrapped in each tube. That is, a slight variation in the count of the crackers can be accomplished by regulating the feed of crackers from the retarding conveyors relative to cracker demand at the measuring or counting conveyors, and this adjustment may be easily accomplished while the apparatus is running and without production interruption.

The foregoing and other objects, advantages and features of construction will become more apparent upon a consideration of the following description together with the accompanying drawings.

In the drawings:

FIGURE 1 is a diagrammatic plan view of a portion of the apparatus comprising the present invention;

FIGURE 2 is a view similar to FIGURE 1, but showing the remainder of the apparatus;

FIGURES 3, 5 and 7 taken together constitute a plan view of the entire apparatus, the broken line at the right hand side of FIGURE 3 and the broken line at the left hand side of FIGURE 5, and the broken line at the right hand side of FIGURE 5 and the broken line at the left hand side of FIGURE 7, indicating the places where the several parts shown would be joined if the three figures were consolidated into one;

FIGURES 4, 6, 8 and 9 taken together constitute a side elevational view of the entire apparatus, FIGURES 4 and 6 being elevational views of the apparatus shown in FIGURES 3 and 5, respectively, and FIGURES 8 and 9 when combined being elevational views of the apparatus shown in FIGURE 7;

FIGURES 10, 11 and 12 are consecutive diagrammatic elevational views showing the position of the crackers through the various handling operations;

FIGURE 13 is a plan view of the apparatus at the first of the shingling and cooling conveyors;

FIGURE 14 is a cross-sectional view looking in the direction opposite to cracker travel, taken on line 14—14 in FIGURE 13;

FIGURE 15 is a plan view of the apparatus at the last of the shingling and cooling conveyors;

FIGURE 16 is a cross-sectional view looking in the direction of cracker travel, taken on line 16—16 of FIGURE 15;

FIGURE 17 is a plan view of the apparatus at the second break station, with certain parts broken away for clarity;

FIGURE 18 is an elevational view of the same, taken along line 18—18 in FIGURE 17;

FIGURE 19 is a cross-sectional elevational view taken on line 19—19 in FIGURE 17;

FIGURE 20 is a plan view, with certain parts broken away for clarity, taken on line 20—20 in FIGURES 18;

FIGURE 21 is a cross-sectional view taken on line 21—21 in FIGURE 19, showing the breaking action on the crackers;

FIGURE 22 is an enlarged view of a portion of the apparatus for receiving the crackers from the apparatus shown in FIGURES 17 to 21;

FIGURE 23 is a fragmentary cross-sectional elevational view taken on line 23—23 in FIGURE 5;

FIGURE 24 is an enlarged fragmentary cross-sectional elevation view taken on line 24—24 in FIGURE 5;

FIGURE 25 is an enlarged fragmentary cross-sectional elevation view taken on line 25—25 in FIGURE 5;

FIGURE 26 is an enlarged fragmentary elevation view taken on line 26—26 in FIGURE 5;

FIGURE 27 is an enlarged plan view of the overrun conveyor apparatus;

FIGURE 28 is a side elevation view taken on line 28—28 in FIGURE 27;

FIGURE 29 is a cross-sectional front elevation view taken on line 29—29 in FIGURE 27;

FIGURE 30 is a fragmentary enlarged view of the same;

FIGURE 31 is a fragmentary perspective view of a portion of an overrun conveyor;

FIGURE 32 is an enlarged plan view of the switching apparatus, the broken line at the left hand side of FIGURE 32 and the broken line at the right hand side of FIGURE 27 indicating the place where the several parts shown would be joined if the figures were consolidated into one;

FIGURE 33 is a cross-sectional side elevation view taken on line 33—33 in FIGURE 32;

FIGURE 34 is a fragmentary plan view of a portion of the apparatus shown in FIGURE 32, and indicating in phantom lines alternate setting of the same;

FIGURE 35 is a plan view of a tamping machine;

FIGURE 36 is a cross-sectional side elevation view of the same taken on line 36—36 in FIGURE 35;

FIGURE 37 is a side elevation view of the tamper, taken on line 37—37 in FIGURE 35;

FIGURE 38 is an enlarged plan view of the cracker metering and counting apparatus;

FIGURE 39 is a side elevational view of the same, taken on line 39—39 in FIGURE 38;

FIGURE 40 is a cross-sectional rear elevation view taken on line 40—40 in FIGURE 39;

FIGURE 41 is an enlarged plan view of a portion of the counting conveyor apparatus;

FIGURE 42 is a cross-sectional plan view taken on line 42—42 in FIGURE 40;

FIGURE 43 is a cross-sectional rear elevation view taken on line 43—43 in FIGURE 38;

FIGURE 44 is a fragmentary enlarged elevational view taken on line 44—44 in FIGURE 41;

FIGURE 45 is a fragmentary enlarged perspective view of a portion of the cracker counting conveyor;

FIGURE 46 is a cross-sectional elevation side view taken on line 46—46 in FIGURE 41;

FIGURE 47 is a view similar to that shown in FIGURE 38 with the crackers in position;

FIGURE 48 is a side elevation view of the same;

FIGURES 49, 50 and 51 are consecutive fragmentary plan view of the crackers as they are segregated into lots for packaging; and FIGURES 52 and 53 respectively are fragmentary cross-sectional views taken on lines 52—52 and 53—53 in FIGURE 47.

*General Organization*

The herein system is arranged on suitable framing members so as to receive a continuous sheet of crackers 101 (FIG. 3) carried from an oven 102 on an endless band conveyor 103, the cracker sheet 101 having parallel scored lines 104 running perpendicular to the path of sheet travel and parallel scored lines 105 extending parallel with the sheet travel. In practice it has been found that cracker sheet 101 eighteen crackers wide may be readily handled by the hereinafter described apparatus. Referring to FIGS. 1 and 2, for convenience and simplicity in understanding the functioning of the apparatus and the nature and advantages of the invention, the portion of the apparatus will be divided into the assemblies as immediately hereinafter designated: Transfer, First Break, Trimmer, Shingling Alignment and Cooling Apparatus A; Second Break Station B; Spreading and Alignment Station C; Overrun and Consolidation Station D; Switching Station E; and Metering and Counting Station F.

*Transfer, First Break, Trimmer, Shingling Alignment and Cooling Apparatus*

The detailed description of this portion of the apparatus is presented in applicants' copending application entitled "Apparatus for Handling Bakery Articles," Serial No. 52,637 filed August 29, 1960.

In view of the description therein, it is apparent that the cracker strips on conveyor 127a have been taken from a bulk continuous flat sheet of cracker strips, subjected to transverse breaks forming a flow of independent cracker strips 116, have been trimmed of their burnt edges to provide strips 116a of crackers of uniform size, color and texture, have been shunted to successively slower moving conveyors and thus marshaled into shingled formation, have been cooled, and the shingled cracker strips 116a have been properly oriented for feed to the next successive station. An essential feature of the hereinbefore described apparatus, of course, is that the shingled strips 116a have been properly oriented and prepared for the immediately succeeding operation thereon, which operation breaks the strips into cracker units of the desired size.

Second Break Station

Again, the detailed description of this portion of the apparatus is presented in the aforementioned co-pending application.

It is apparent from the foregoing description that as the shingled cracker strips 116a are discharged from the flight of conveyor 127a to the second break station, at 226 of FIGS. 5 and 6, the crackers in each transverse strip are still connected together. At the second break station, however, the crackers of each transverse strip are broken from adjoining crackers along the scored lines 105 to form the marshaled or aligned formations of rows 237 of independent cracker units 116b.

Spreading and Alignment Station C

The separated individual cracker units 116b issue from the breaker wheels in parades of 18 rows 237, the crackers of which are shingled and in close formation. It, therefore, is necessary to separate and space the rows into 18 distinct controlled lanes of crackers for which fixed guides are introduced to facilitate succeeding automatic handling and conveying operations. Further, experience has shown that some waste or trailings always result during the breaking processes. These scraps, of course, must be eliminated from the whole crackers before the same are packaged. These needs are fulfilled at the spreading and alignment station C, the operation of which is so synchronized to the cracker discharge from the breaker station B that the crackers are maintained in the same approximate shingled relation as they were when they left conveyor 201.

Referring to FIGS. 5, 6 and 22 to 26, station C comprises a carrier 301, arranged to receive the crackers 116b from conveyor 201 in close formation, and includes a series of paired endless V-belts 302—302, there being one pair of V-belts for each cracker row 237, or, in the herein illustrated embodiment of the invention, 18 pairs of V-belts 302—302. Each pair of belts 302—302 is strategically arranged with respect to the breaker wheels 212, 225, and is so positioned as to receive thereon the crackers comprising one of the rows 237 which has been discharged from conveyor 201. Each belt 302 travels at substantially the linear speed of conveyor 201 and between pulleys 303—304, respectively, at the start and end of its flight, and further over various idler pulleys 305 positioned intermediate the ends of flight. Pulleys 303 are keyed to a common shaft 306, while pulleys 304 and 305 are rotatably mounted, respectively, on shafts 307 and 308. Drive is supplied to the belts 302 by means of a variable speed motor 309, the shaft of which carries a sprocket 310 over which a chain 311 passes to another sprocket 312 fixed to shaft 306. Shaft 306 is suitably rotatably mounted between horizontal frame members 313—313 while shafts 307 and 308 are also supported by the same.

As seen in FIGURE 5, the V-belts 302 in each pair thereof, travel in spaced parallel paths while the pairs of V-belts 302—302 are arranged to fan out or diverge from each other in the direction of belt travel. Immediately adjacent to the start of flight of the paired V-belts 302—302, a table 314 (FIGS. 5, 22, 25) is provided, the table 314 having a series of paired notches 315—315 in which each pair of V-belts 302—302 travels. Like the V-belts 302, the notches 315 in each pair thereof are arranged in parallel relationship, while the pairs of notches 315—315 are divergently directed, or fan out to direct the travel of the V-belts 302—302 therein. Table 314 extends approximately to the center of flight of the belts 302, after which the belts travel in space. An essential feature of this arrangement is that any scrap which accumulates with the crackers during the preceding operations thereon falls through the spaces between the belts, and hence is not carried along to subsequent stations. A tray 316 is provided below the belts 302 to catch and collect the falling scraps.

As shown in FIGURES 5, 6 and 26, a flat endless belt conveyor 317 is arranged adjacent the ends of flight of the V-belts 302 to receive the spaced cracker rows 237 therefrom. Conveyor 317 has sufficient width to span the ends of flight of all V-belts 302 and travels at speed approximating the speed thereof, whereby the crackers 116b retain the same shingled angle as they had on carrier 301. Travel of conveyor 317 is over ledges 318, 319, respectively at its start and end of flight, over idlers 320 and a drive roller 321, keyed to a shaft 322 carrying a sprocket wheel 323 over which a drive chain 324 passes to a sprocket wheel 325 fixed to the shaft of a variable speed motor 326.

As the shingled cracker rows 237 are discharged onto conveyor 317, each row is separated from rows adjacent thereto by a distance approximating the width of a cracker, while the crackers 116b in each row are in a somewhat irregular arrangement due to the previous handling and conveying operations thereon. Accordingly, means are provided at conveyor 317 for funneling the crackers of the rows into orderly lines, and for positioning the crackers into distinct rows in side by side parallel arrangement as the crackers are discharged from conveyor 317. This is accomplished by the introduction of a series of fixed variously shaped guides 327 positioned slightly above conveyor 317 so that the same travels freely thereunder. The cracker rows 237 are discharged onto conveyor 317 between pairs of guides 327 which thus provide controlled lanes 328 wherein the rows 237 travel. As seen in FIGURE 5, the guides 327 are so shaped as to converge the rows 237 towards each other while each lane 328 is of gradually decreasing width and at the end of conveyor flight is of only slightly greater width than the width of the crackers 116b therein, whereby the crackers experience a lateral sliding action as they travel on conveyor 317 and at the discharge thereof are arranged in more orderly rows. The guides 327 are suspended above conveyor 317 by means of screws 329 threadably adjustably attached thereto and suspended from a horizontal member 330 spanning the width of conveyor 317.

Overrun Station D

At the discharge of conveyor 317 the cracker units are arranged in 18 independent rows of shingled cracker units ready for packaging. Even in large quantity production, however, it is a difficult problem to direct the cracker units to packaging machinery without first reducing the number of rows to a lesser number thereof. The alternative is to employ a separate packaging machine for each row. Under the latter plan, the working area required and cost is prohibitive, while the packaging machinery never could be employed at its full capacity. Instead, the present station D employs a novel apparatus and technique for selectively accelerating rows of shingled cracker units in proper sequence so that the rows sequentially may be discharged into a consolidation area whereat they are arranged in a lesser number of orderly rows. For example, in the herein illustrated embodiment of the invention, the 18 rows of cracker units are changed into but 3 rows.

Referring to FIGURES 5, 6 and 27 to 31 for the purpose of explanation, the 18 rows of cracker units may be considered as having been discharged from conveyor 317 into the 18 lanes 402a1 to 402c6 comprising highways 401. In the present instance, there are three highways 401 bracketed at the right in FIGURE 27 as 401a, 401b, and 401c, each comprising 6 lanes 402. The lanes 402 of each highway are separated from the lanes adjacent thereto by fixed guides 403, the end portions 404 (FIG. 27) of which are wedge shaped and thus arranged to narrow the path in which the crackers move to a width approximately that of the crackers so that the cracker units are maintained in orderly progressions at station D. The guides 403 are attached to a series of horizontal members 405, which members span across the lanes and at each end are maintained above the apparatus frame by vertical legs 406 (FIG. 29) joined to frame members 407—407 at each side of station D. Adjustable screws 405a provide means by which the suspension of the guide 403 may be varied.

Movement of the cracker units down the lanes 402 is accomplished by means of a conveyor system 408. The latter includes a series of parallel running flat endless belts 409 (FIGS. 29, 30) traveling over rails 410 below the guides 403, extending laterally beyond the guides, and separated from each other so as to leave an open slot 411 between adjacent belts. Belts 409 lie in a common plane and are driven in unison by a common driveshaft 412 which carries a wide pulley roll 413 around which the belts 409 are trained. At their other end of flight the belts travel over a wide pulley roll 414 keyed to a shaft 415, as best seen in FIGURE 28. The speed of travel of the belts 409 approximates that of conveyor 317 so that the cracker units are maintained at substantially the same angle of shingle. Drive is supplied to shaft 412 by a variable speed motor 416, sprockets 417, 418 and chain 419 traveling thereover. Slack in each of the belts 409 is taken up by an idler 420 rotatably mounted on a shaft 421 held on a weighted pivotal arm 422. Suitable frame members 423 support the rails 410.

A rigidly guideway or track 424 (FIG. 30) is positioned below each slot 411, and in each track 424 there rides an endless acceleration conveyor 425 in the form of a link chain 425a traveling parallel with the lanes 402 and between sprockets 426, 427. In the illustrated embodiment, the total length of each chain 425a (FIG. 28) is eighteen feet, for reasons which will become more obvious hereinafter, while its track 424 underlies about six feet of its effective flight. The chains 425a are driven in unison by a common rotatable drive shaft 428 to which the sprockets 427 are fixed, while the sprockets 426 are maintained on a common shaft 429. Drive is supplied to shaft 428 by means of motor 416, the shaft 430 of which also carries a second sprocket wheel 431 over which a drive chain 432 travels to a sprocket 433 provided on shaft 428. Each chain 425a, during its flight, passes over a sprocket 434 mounted on a rotatable shaft 435, and over an idler sprocket 436 rotatably mounted to a pivotal arm 437 arranged to take up slack in the respective chain.

As is apparent from FIGURE 28, the start of flight of the belts 409 is before that of the acceleration conveyors 425, while the ends of flight of the latter extend beyond those of the belts. While the belts 409 and chains 425a are driven from a common motor 416, the speed of the chains 425a is faster than that of the belts 409. In the herein described embodiment of the invention, the drive ratio between the chains 425a and belts 409 is such that the former travel at six times the speed of the latter for reasons which will become more apparent hereinafter.

Each track 424, in its lower surface and adjacent its respective ends, is provided with tranverse slots 438 which are arranged to receive freely therein supports 439 extending horizontally between the frame members 407—407. In their rest position tracks 424 are held by the supports 439, while the chain structures travel thereon below the surface of belts 407 and thus have no effect on the cracker units carried by the belts.

Means are provided for independently vertically raising each track 424, as exemplified in the herein-described embodiment of the invention by a series of reciprocable hydraulic motors 440, the vertically movable plungers 441 of which are each positioned below a respective track 424 intermediate the ends thereof so as to engage and raise the respective tracks when the corresponding hydraulic motor is actuated. Each lane 402 thus is provided with spaced traveling endless belts 409 which receive and carry the cracker units 116b in shingled formation and at a normal rate of travel approximating that of conveyor 317; a vertically reciprocable track 424 positioned below and intermediate the belts 409; an acceleration conveyor 425 in the form of an endless chain 425a traveling over each track 424, normally below the belts 409, and at six times the speed of said belts; and a hydraulic motor 440 for raising any said track to a position whereat said chain is effective to move the cracker units in the lane 402.

A suitable control arrangement synchronized with speed of travel of the acceleration conveyors 425 is used for supervising and regulating timely actuation of the hydraulic motors 440. For instance, a series of six hydraulic cylinders, designated 442 in general and individually as 442–1, 442–2, etc., and their reciprocable biased plungers 443 may be annularly arranged about a shaft 444 carrying a control cam 445 against which the plungers 443 ride. A suitable frame, not shown, maintains the cylinders 442 in position. Each of the cylinders 442 is connected by a suitable conduit system including a main line 446, and lines 447a, 447b, and 447c branching therefrom, to three of the hydraulic motors 440. One of the hydraulic motors 440 in each group of three is located below a respective lane 402 in each of the highways 401. Thus each of the cylinders 442 supervises the raising of three tracks 424, or one in each highway 401; and, the six cylinders 442 control the operation of the eighteen hydraulic motors 440, each of which is arranged to raise and lower independently a respective track 424 to selectively accelerate the travel of shingled cracker units in the corresponding lane 402 below which track is located.

Drive for cam shaft 444 is provided to a sprocket 448 thereon by a chain 449 which passes over sprocket 450 carried on a rotatable shaft 451. Gears 452, 453, connect shaft 451 with shaft 435 to complete the drive train. As is apparent from the foregoing description and FIGURE 28, drive for cam shaft 443 is derived from the acceleration conveyors 425 and thus is synchronized to the travel thereof.

The peripheral surface of control cam 445, which surface is engageable by the biased operating plungers 443 of the cylinders 442, is provided with an accentuated portion 454 thereon. During rotation of cam 445 the accentuated portion 454 sequentially pushes against each plunger 443. As a plunger 443 is moved inwardly it compresses hydraulic fluid in its respective cylinder 442 and in the lines connected thereto to actuate instantly the three hydraulic motors 440 connected with said hydraulic cylinder. Further travel of cam 445, of course, moves its accentuated portion 454 away from the engaged plunger 443 and onto the succeeding plunger, thereby restoring the original pressure in the previously pressurized system and contemporaneously pressurizing the system controlled by the succeeding engaged plunger to thereby actuate three more hydraulic motors 440. While the foregoing described control for the hydraulic system is of the direct-thrust type, it also should be understood that a hydraulic pumping system using controlled valving may be employed equally as well.

As described hereinbefore, actuation of a hydraulic motor 440, in turn, causes its respective track 424 positionable thereby to rise and locate the acceleration contionable thereby to rise and locate the acceleration conveyor 425 running on such track above the belts 409 in the lane 402 at which said track is located. This action lifts the cracker units from the belts 409, and allows them to be carried along at the accelerated speed of the respective conveyor 425. To facilitate lifting of the cracker units, each acceleration conveyor 425 may be provided with a platform 455 (FIGS. 29 to 31) comprising a plurality of sections 456 suitably attached to the conveyor linkage structure and extending therealong for a distance approximating the length of crackers which it is desired to accelerate. For example, in the particular embodiment of the invention described herein, the platforms 455 extend along the respective conveyor structures 425 for a distance of approximately six feet. An L-shaped clip 457, carried at the rear end of each platform, is arranged to pick off a six foot length of cracker units, as its respective acceleration conveyor 425 is elevated, and thereby distinctly separate the cracker units to be accelerated from those which are allowed to remain behind on the belts 409. The acceleration conveyors 425 at each highway 401 are arranged in staggered order; that is, the platforms 455 and clips 457 are arranged to pass over the tracks 424 of each highway 401 at different intervals of time. Correspondingly the tracks 424 of each highway 401 are raised in staggered order and in timed relation to their respective acceleration conveyors 425 passing thereover, whereby each track 424 is raised only after its respective platform 455 and clip 457 are positioned thereon.

For example, in FIGURES 27, 29 and 30, the lanes 402 are given specific designations. Thus in highway 401a, the lanes are designated 402a1, 402a2 . . . 402a6; those in highway 401b are designated 402b1, 402b2, etc.; and those in highway 401c are designated 402c1, etc. Further, it will be understood that the hydraulic motors 440 below lane 402a1, 402b1, and 402c1 are commonly connected by appropriate lines to a respective hydraulic cylinder 442-1; that the hydraulic motors 440 below lanes 402a2, 402b2, and 402c2 are commonly connected to a hydraulic cylinder 442-2; and that the same similarly is true of the remaining hydraulic motors and cylinders.

Any suitable order staggering the flight of the accelerator conveyors 425 and the raising of the tracks 424 in each highway may be employed. The essential features for the lanes of each highway are that the order of actuation of the respective tracks and the order of flight of the respective conveyors 425 thereon shall be the same; track elevation should take place only after the clip 457 of the acceleration conveyor thereon has passed onto the track; and no succeeding track 424 shall raise its acceleration conveyor 425 until the end of the platform 455 on the immediately preceding elevated track is in a position to clear station D prior to the start of the platform on said succeeding track clearing the station. The latter feature assures that no interference is experienced between the cracker unit flow from the several lanes 402 of each highway 401. Since the chains 425a in the herein described embodiment are eighteen feet long, and since there are six acceleration conveyors 425 in each highway 401, one way of carrying out this feature is to stagger the flight between successively raised chains and space the clips 457 between said successively raised chains approximately six feet apart. Once the correct relative position between successively raised platforms 455 is established on the conveyors 425, this feature is easily maintained; since the conveyors 425 are all driven over the same distance and at the same speed. Further, in carrying out this feature, in the herein particular embodiment of the invention, elevation of each track 424 occurs during alternate flights of its respective platform 455 thereover due to the particularly long nearly six foot length of cracker units each platform is adapted to carry during its effective flight and further due to the fact that each conveyor 425 is only eighteen feet long. Thus, there being six eighteen foot long conveyors 425 in each highway, and six foot lengths of veyors 425 in each conveyor, by raising each track platforms 455 in each conveyor, by raising each track 424 for alternate passes of its respective conveyor 425, sequential raising of conveyors 425 in each highway 401 may be accomplished without unduly lengthening the extent of station D. The drive train to cam shaft 443 accordingly also is designed and arranged to rotate cam 445 so as to cause timely elevation of tracks 424 in accordance with the foregoing provisions.

In the present embodiment of the invention the hydraulic motors 440 are so employed as to simultaneously raise the tracks 424 in similarly located lanes of the highways and thus similarly located motors 440 are connected with the same one of the hydraulic cylinders 442. Thus, in FIGURE 29 it can be seen that the tracks at lanes 402a2, 402b2, and 402c2 are in raised position in their respective highways. A suitable sequence for raising the tracks 424 in each highway has been found in the following order of lanes (referring only to the suffix numeral designations thereof): 6, 4, 2, 1, 3, 5. Therefore, the tracks of the next group to be elevated are in lanes 402a1, 402b1, and 402c1.

It will be noted that the tracks 424 extend adjacent to the ends of flight of the belts 409, and that the acceleration conveyors 425 carry the cracker units to the end of station D whereat from each highway the crackers issue forth from the lanes thereof in staggered order. It will further be understood that with the herein illustrated embodiment of the invention the discharge from the highways is simultaneous, although it need not be from similarly located lanes. The important feature is that 18 lanes of cracker units are in effect reduced to three flows of cracker units at the discharge of station D.

Cracker units are borne along by the belts 409—409 in each lane until a substantially six foot length of cracker units overlie the track 424 thereat, by which time the respective acceleration conveyor 425 thereat is made effective by timely elevation of its track 424. This, in turn, accelerates the cracker units to the discharge of station D. The only action that the length of cracker units experience is a slight raising and an acceleration thereof. At no time is any other external force applied to the cracker units with the exception of the action of the clip 457 which serves to pick off and separate the cracker units to be accelerated.

The action of the clips 457 as they pick off a group of cracker units to be accelerated has a tendency to upset the shingled relationship of the cracker units. For this reason, at each lane 402, an elongated and light flat blade 458 (FIGS. 27, 28) may be positioned so that the cracker units pass thereunder. The blades 458 are pivotally mounted to a suitably held shaft 459. As an acceleration conveyor 425 is raised, the blades 458 thereat serve to maintain both the shingled cracker units about to be accelerated, and those left behind on belts 409, in their correct shingled positions.

Each lane 402 adjacent the discharge thereof further may be provided with a small nozzle 460 (FIGS. 27, 28) from which there issues a continuous jet of air which serves to maintain the cracker units shingled forwardly as they are discharged from the respective acceleration conveyor 425. The nozzles 460 are connected to a common header 461 mounted on the end horizontal member 405.

Overrun and Consolidation Station E

The cracker units issue from the three highways of the overrun station D in three continuous parades indicated generally at 501 and individually as 501a, 501b, and 501c. Each parade is formed from the approximate six foot lines 502 of shingled cracker units discharged from the several lanes in staggered relation. These staggered lines 502 of each parade must be conditioned into alignment and readiness for subsequent operations thereon. Discharge of the parades of staggered lines 502 from the overrun station D, however, brings them to consolidation station E whereat a novel construction not only directs the staggered lines of each parade into single line formation, but further may be arranged to selectively lead the single line formations toward alternate succeeding handling stations hereinafter described.

Referring now to FIGURES 7, 8 and 32 to 34, conveyor means 503a are provided for transporting the cracker units discharged from each of the three highways 401a, 401b, and 401c. In the particular embodiment of the invention illustrated in the drawings, this means is in the form of a flat endless belt conveyor 503 spanning the discharge ends of all lanes 402, and adapted to receive the lines of cracker unit flow therefrom. Conveyor 503 is driven by a variable speed motor at a speed sufficiently rapid so that there is no interference between lines 502 of each parade discharged from the acceleration conveyors 425. More particularly, conveyor 503 is driven at a speed approximating that of the accelerating conveyors 425. In its path of endless flight, conveyor 503 is trained over a wide pulley roll 504 by idlers 505, 506, and at its end of flight travels over ledges 507, 508. Drive is supplied by a motor 509 to the shaft 510 on which roll 504 is fixed by a chain 511 traveling over sprockets 512, 513.

Three distinct paths 514a, 514b, 514c are provided for the lines of cracker units on conveyor 503 by fixed guides 515, 516, extending parallel with conveyor 503 at each side thereof, and intermediate guides 517, 518 and 519. Each path, and the guides defining the same, is arranged to receive the staggered lines 502 of cracker units discharged from one of the highways of overrun station D. Thus, path 514a receives lines of the cracker units discharged from the lanes 402 of highway 401a; path 514b receives those discharged from lanes 402 of highway 401b; and path 514c receives the staggered lines discharged from highway 401c.

The intermediate guides 517, 518 and 519, are suitably supported slightly above the surface of conveyor 503 by a horizontal span 520 from which they depend. The ends of span 520 are affixed atop fixed guides 515, 516. The guides are so arranged that each of the three paths defined thereby narrows to a width only slightly greater than that of the cracker units being conveyed therein. Thus, the lines 502 of cracker units, as they travel forward on conveyor 503, may engage the guides which, in turn, cause them to experience gradual lateral sliding movement on the conveyor, whereby all cracker lines 502 in each path reach the same point of discharge. Additional extensions 521 are provided adjacent the end of each guide, the extensions also being supported slightly above the flight of conveyor 503.

The intermediate guides 517, 518, 519 further each may be adjustably attached to span 520 at a respective pivot shaft 522 which extends through a slot 523 therein so that the guides may be variably positioned to provide alternate paths for the staggered lines of cracker units to follow, as indicated by the phantom lines in FIGURES 7 and 34. Each intermediate guide further may be provided with structure for maintaining the same in a selected position. In the present instance, this structure includes a small shaft 524 extending vertically upward from the intermediate guide and through a slot 525 cut in a second horizontal span 526 also affixed atop the fixed guides 515, 516. Each shaft 524 has a handle 527 threadably mounted thereto, which handle serves as a lock nut engageable with span 526 to lock its respective guide in position. From the arrangement of both the phantom and solid lines shown in FIGURES 7 and 34, it thus can be seen that the three parades of cracker units may be selectively discharged at alternate three of four discharges 528a, 528b, 528c, and 528d, provided by the guides at the end of flight of conveyor 503. It further may be seen that the cracker unit lines of each parade are consolidated or funneled into discharged alignment by the guides 515 to 519. Furthermore, selective positioning of guides 517, 518, 519 may be accomplished without stopping any equipment or causing production interruption. It should be understood, of course, that the herein described basic switching concept is adaptable to consolidation of any number of lanes within reason and not merely to the described arrangement.

Metering and Counting Station F

Crackers leaving station E thus have experienced cooling, shingling, transformation into the desired cracker units sized for packaging and consolidation into a small number of parades which may be easily and conveniently handled and hence conditioned for segregation into lots of predetermined number of preparatory to packaging. The segregation operation is accomplished at station F whereat apparatus is provided for each of the three parades of crackers for counting and separating the crackers into lots of the desired weight or number. Since at station F the handling operation on each parade is similar to that on the others, the apparatus provided for measuring and separating the crackers is essentially the same for all parades, and, accordingly is described and illustrated in detail for only one parade. However, as seen in FIGURE 7, four such sets of apparatus are shown, there being one extra which serves as reserve equipment ready to receive and handle the cracker flow in the event the guides 517, 518, 519 of station E are alternately positioned, such as when it is desired to direct the crackers to standby packaging equipment.

Referring to FIGURES 7, 9 and 35 to 53, as a parade of crackers is discharged from conveyor 503 it enters onto a long and narrow endless band advancing conveyor 601, traveling at substantially the linear speed of conveyor 503, and having sufficient width to accommodate the crackers thereon. Conveyor 601 is supported by a U-shaped channelway 602 (FIGURE 43), the sides of which further serve to guide the crackers. As the crackers advance with conveyor 601, they must pass cracker retarding and metering means 603, which in the herein illustrated embodiment comprises a pair of endless chain conveyors 604, 604a (FIG. 38), positioned one on each side of conveyor 601 and carrying soft paddings 605 arranged to engage and grip the crackers therebetween. The surface speed of conveyors 604, 604a is less than that of conveyor 601, thereby retarding cracker flow on conveyor 601, resulting in cracker accumulation thereon to assure a constant cracker supply to the hereinafter described counting apparatus while causing the crackers to assume a vertical position as they accumulate.

Since the crackers, as they pass conveyors 604, 604a, are gripped therebetween by the soft padding 605, and hence experience resistance to their movement with conveyor 601, the latter slips under the crackers because of its greater surface speed. Adjustment of the number of crackers permitted to pass conveyor 604, 604a relative to the surface speed of conveyor 601 determines the rate at which the crackers are delivered to the cracker counter mechanism, hereinafter described. The pressure exerted by the retarding conveyors 604, 604a on the crackers may be varied to change the resistance to cracker movement with conveyor 601, but this may cause complications, since accurate control would be difficult and there would be the danger of too much pressure causing cracker fractures. Instead, for example, it has been found that by varying the surface speeds of conveyor 604, 604a, and maintaining the pressure exerted by them on the passing crackers substantially constant, cracker feed can be correspondingly varied. That is, as the speed of conveyors 604, 604a is increased, a greater length of crackers pass thereby on conveyor 601 during a given interval of time. On the other hand, as the surface speed of the retarding conveyors is lowered, the length of stacked crackers passing thereby during the same time interval is correspondingly shorter.

Each of the chains of the conveyor 604, 604a runs between sprocket 607, 608, at its ends of flight and over a third sprocket 609 (FIG. 39) which acts to direct its respective conveyor against the crackers. The sprockets 607, 608, 609 are suitably mounted to shafts 610, 611, 612, respectively, and shafts 610 and 611 are mounted to an arm 613 beside channelway 602, each side of which is provided with a slot 614, through which the padding 605 may project against the crackers. One rather convenient way of maintaining conveyors 604, 604a taut is by mounting shaft 612 to a pivoted arm 615 which may be adjustably locked in position by a nut 616.

Suitable mechanism is provided along the flight of the crackers to press gently down those crackers standing vertical but which do not settle freely upon conveyor 610, so that the crackers are arranged uniformly thereon. This mechanism may be provided in the form of the tamper mechanism 617 illustrated in detail in FIGS. 35–37. Tamper 617 includes a plate 618 turned upwardly slightly at its ends and supported above the flight of conveyor 601 by an arm 619 fixed to a member 620 carrying a pair of spaced horizontal and parallel extending shafts 621—621. A suitably supported table 622 carries a pair of rotatable spaced shafts 623—623 mounted in bearings 624 and carrying at their respective ends crank arms 625—625 engageable with the shafts 621—621. Shafts 623—623, at the other ends thereof, carry sprocket wheels 626—626 over which a drive chain 627 passes to a sprocket 628 fixed to the shaft 629 of a drive motor 630.

As the shafts 623—623 and their respective crank arms 625—625 turn, they cause plate 618 to experience, in its rotary oscillatory movement, short rises and lowerings which act to tamp down any crackers projecting out of line. As seen in FIGURE 36, the rotary action is clockwise as the crackers move from the left to the right, and further is sufficiently rapid, whereby there is little, if any, frictional engagement or rubbing by plate 618 against the crackers, thereby preventing injury to the crackers.

Conveyor 601 at its ends of flight is trained over pulley rolls 631—631, and further is trained over a large pulley roll 632 by means of idlers 633. Pulley roll 632 is fixed to a driven rotatable shaft 634. It should be noted, as shown in FIGURE 7, that conveyor 601 is sufficiently long to accommodate cracker accumulation thereof caused by the metering and retarding conveyors 604, 604a, and that subsequent to said retarding conveyors the crackers travel only a short distance before being discharged from conveyors 601. A stationary guideway 635 is positioned immediately adjacent to the end of flight of conveyor 601 for receiving the metered crackers therefrom, and comprises along a portion of its body a pair of parallel extending horizontal rails 636—636, separated by a slot 637, and provided with guides 638—638 which prevent the crackers from falling or becoming misaligned. Crackers entering onto guideway 635 are moved along on the rails 636—636 by the pressure of succeeding crackers discharged from conveyor 601. Means further are provided at guideway 635 for maintaining the crackers thereon in vertical position. In the instant embodiment of the inventions as seen in FIGURES 52 and 53, this means is in the form of oppositely facing soft nylon brushes 639, 640, positioned respectively above and below the rails 636—636 and arranged with respect to the crackers thereon to engage the same and offer sufficient gentle resistance as to be able to maintain the crackers vertical during travel. Near the end of the first set of brushes 639—640, a pair of oppositely facing brushes 641—642 is arranged to engage the sides of the crackers passing thereby for the same purpose. All brushes are held in position by suitable supports (not shown in the drawings).

As the crackers advance in guideway 635, they must pass the pick off section 643 of the cracker linear counter mechanism whereat they are separated into lots of predetermined number. In the present embodiment of the invention, this mechanism includes a pair of endless conveyors 644, 645, (FIG. 47) positioned one at each side of guideway 635, and traveling in synchronism. Each conveyor 644—645, is in the form of a continuously traveling endless chain 646, at its extreme ends of flight traveling over sprocket 647, 647a, respectively carried on vertical shafts 648, 649 (FIG. 41), suitably mounted on a horizontal member 650. Each conveyor 644, 645 has a first run portion adjacent guideway 635, as best seen in FIGURE 38. A third intermediate sprocket 651 is provided for each counter conveyor, and is mounted to a vertical shaft 652 also suitably held on member 650. The third sprocket 651 defines the end of the first run portion and the beginning of a second run portion extending divergently from guideway 635. To maintain each cracker counter conveyor taut, tensioning means 653 is provided therefor, and comprises an idler sprocket 654 rotatably fixed to an arm 655 pivoted to member 650 on a pillar 658 fixed thereon. A spring 657 is anchored around pillar 658 and acts against a post 656 to urge sprocket 654 against the conveyor chain 646 (FIGS. 41 and 46).

Each conveyor chain 646 carries a set of uniformly spaced cracker pickoff lugs 659 thereon. The lugs 659 of the conveyor 644, 645, are arranged complementary to each other so that lugs on each conveyor chain 646 begin and end their flight along the first run portion in synchronism. As further seen in FIGURES 38 and 47, three such pick-off lugs are mounted on each chain 646. The lugs 659 are made of a soft spongy material, such as sponge rubber, so as to not injure the crackers they engage, and are mounted on their respective chains 646 by means of bracket 660 as seen in FIGURE 45. Each lug 659 further has a protruding portion 661, the peripheral surface 662 of which is slightly rounded, whereby the crackers engaged are gradually gripped between opposite paired lugs 659 which then control the travel of the engaged crackers as well as those preceding the same.

Crackers advance on guideway 635 and past the start of flight of conveyors 644, 645, until paired lugs 659 carried thereby move into the first run portion, engage crackers thereat, and thereby drive forward the engaged crackers and crackers preceding the same. The linear speed of conveyors 644, 645, is faster than that of retarding conveyor 604, 604a, and the feed of crackers therefrom; and, hence, the crackers are accelerated forward by the lugs 659, and separated from the foremost ends of the continuously advancing metered cracker line. The action of separating the crackers into lots or groups 663 from the end of the metered cracker line is repetitive to provide thereby a continuous supply of cracker lots 663 prepared for packaging. The number of crackers in each separated lot 663, or the weight thereof, is controlled by the cracker feed from the retarding conveyors 604, 604a, hereinbefore described. The faster the crackers feed therefrom, the greater is the number of crackers in each cracker lot 663.

It is preferred that the speed of conveyors 644, 645, be such that cracker lot feed therefrom is synchronized to the speed of the wrapping apparatus, indicated generally at 664. The conveyors 644, 645 may feed the cracker lots directly into the wrapper, or as in the herein illustrated embodiment of the invention, the wrapper 664 may be provided with an endless conveyor 665 which starts its flight substantially adjacent the location where the conveyors 644, 645 diverge from guideway 635. Conveyor 665 travels beneath guideway 635, and carries outwardly extending fingers 666 suitably spaced apart and arranged to extend through guideway slots 637 to receive separated cracker lots 663 therebetween. As paired lugs 659 drive a separated cracker lot 663 forward, they reach the sprockets 651, and thereafter diverge from guideway 635, thereby releasing the crackers. Contemporaneously, the fingers 666 of the wrapper conveyor 665 receive the cracker lot therebetween to carry it towards the wrapping mechanism. Accordingly, conveyors 644 and 645 are synchronized to the speed of the wrapper conveyor 665, and the crackers experience little, if any, change of speed as lugs 659 relinquish control over a cracker lot and finger 666 takes over the feed of said lot.

Referring to FIGURES 39 and 40, drive to the cracker counter conveyor 644 is supplied by a rotating shaft 667 suitably driven by the wrapping apparatus 665, bevel gearing 668 which rotatably drives shafts 649 and sprocket 647a thereon. Adjacent to its bottom, shaft 649 carries a gear 669 which through a gear train 670 rotatably drives counter conveyor 645 through its respective shaft 649 and sprocket 647. The gearing ratios are so designed that conveyors 644 and 645 are driven in synchronism with each other and with wrapper conveyor 665. The shaft 649 of conveyors 645 carries a sprocket 671 which serves as a power take-off to drive conveyor 601 through a suitable chain and gear drive 672, including a chain 673 which passes over a sprocket 674 keyed to pulley shaft 634.

Drive to retarding conveyors 604, 604a is provided by a suitable take-off from drive train 672, including an endless chain 675 traveling over a sprocket 676 keyed to a shaft 677 of gear box suitably mounted for rotation. Drive to chain 675 may be supplied by a variable speed drive unit 678. Unit 678, as seen in FIGURE 39, is driven by train 672 and further through chain 673 drives conveyor 601. Thus, on the herein described embodiment as the output from unit 678 is changed, the speeds of both conveyor 601 and conveyors 604, 604a, are correspondingly changed, as shaft 679 and gearing 680 provides the connecting drive to power the respective shafts 610 of conveyors 604, 604a.

As hereinbefore described in the detailed description of each particular section of apparatus, the surface speed of accumulation conveyor 601 approximates that of consolidation conveyor 503; the surface speed of synchronized cracker retarding and metering conveyor 604, 604a generally is less than that of accumulation conveyor 601; and the surface speed of synchronized conveyors 644, 645 is greater than that of conveyor 601 and under the supervisory control of the wrapping apparatus, being synchronized to the demand thereat for separated cracker lots 663.

In order to achieve accurate pick-offs of cracker lots 663 by lugs 659, there may be provided mechanism for assuredly moving the lugs into precise, timed contact with the crackers at the foremost end of the continuously advancing metered cracker line. Referring to FIGURES 40 and 42, this mechanism, at each of the cracker counter conveyors 644, 645, includes having member 650 pivotally mounted with respect to shaft 649, and having a pillar section 681 depending from member 650. At its lower end, pillar section 681 carries a bottom plate 682 through which shaft 649 rotatably extends, and a cam follower 683 is provided on bottom plate 682. The entire assembly is suitably supported on a frame member 684. The particular illustrated embodiment of gear train 670 contains four gears, and shafts 685 of the intermediate of these gears extend upwardly and carry a cam 686 against which a respective cam follower 683 rides. Posts 687—687 are provided on the members 650, and a tension spring 688 is anchored therebetween.

As the cams 686 turn, they urge their respective cam followers mounted to the bottom plate 682 to turn said plates and pivot the member 650 about their respective shafts 649. This moves the members 650 divergently from each other and from guideway 635. Continued turning of the cam 686 allows spring 688 to be effective and move the members 650 towards each other and guideway 635, thus bringing the first run portions of each conveyor into substantially parallel alignment with guideway 635. The pivotal action is so timed that as paired pick-off lugs 659 reach a point where they are about to engage the crackers, spring 688 urges the members 650 towards each other. As a consequence, the pick-off lugs 659 not only swing about their sprockets 686 to start their flight, but further experience the lateral movement with members 650, which lateral movement positively and accurately positions the cracker pick-off lugs into engagement with the crackers to be accelerated by the counter conveyors 644, 645.

To facilitate positioning of the crackers upright during their movement in guideway 635, nozzles 689 (FIG. 38) may be provided on either side thereof to direct jets of air which thus maintain the crackers in correct position. The nozzles 689 are connected with and supplied from headers 690—690.

Operation

Summarizing briefly the operation discussed in the foregoing description, it will be noted that the crackers are supplied from the oven 102 as bulk comprised of embossed sheets 101. The sheets pass the first break station which includes rollers 112 which fracture them along scored lines 104 to provide cracker strips 116 of the desired size. In the herein described and illustrated embodiment of the invention, the sheets are broken into single line cracker panel strips 116; although, of course, it is understood that the apparatus may be arranged to provide strips of two or even more lines of cracker panels. The burned edges 118 of the strips 116 next are removed by the shearing disks 122. The advancing trimmed strips 116a thereafter are cooled and shingled on the successively slower moving conveyors 125, 126, 127 and 127a, and further are properly oriented in their travel by auxiliary conveyor belts 142, 143 and 157, 158, for the second break operation.

At the second break station, the shingled strips 116a are carried between belt conveyors 201, 226. Cooperable staggered break wheels 212, 225 provide suitable pressure on the belts 201, 226, to fracture the strips along scored lines 105, thus providing cracker panels 116b of the desired unit size for packaging. During the second break operation, the belts 201, 226, maintain the units in orderly marshalled rows 237 for subsequent operations.

The cracker rows 237 are continuously fed onto spaced paired belt conveyors 302 whereat any crumbs resulting from the breaking operations fall free of the crackers, while the rows are fanned outwardly with respect to each other. Thereafter, the advancing rows 237 are shunted into control lanes defined by fixed guards which direct the cracker rows to the overrun conveyor assembly.

At the latter, the cracker rows 237, eighteen of which are provided in the herein embodiment of the invention, continuously advance on the belts 409 traveling in their respective controlled lanes 402, and have their foremost end portions periodically and sequentially picked off and accelerated by their respective accelerator conveyors 425. While only the lanes 402 in highway 401a are shown in FIGURE 27 with advancing cracker rows 237, the same action, of course, also takes place in the remaining lanes. In the particularly described embodiment, the eighteen lanes 402 are considered as parts of three highways 401. Each highway comprises six lanes which have their foremost end portions of the cracker rows therein sequentially accelerated to form a single cracker parade of staggered lines 502 from the respective six rows. Three such parades 501 of staggered lines thus are provided, and the respective staggered lines of each parade are thereafter funneled or consolidated into continuous line relationship at station E.

Each consolidated cracker parade enters onto a respective accumulation conveyor 601 whereon the crackers are raised to a vertical position as they accumulate. The accumulated vertically standing crackers must pass metering conveyors 604, 604a. The latter control the rate of cracker feed to the conveyors 644, 645, and thus, when combined therewith, the length of the separated stacked cracker lots 663. Conveyors 644, 645 separate the crackers into lots 663 of the desired size and at a rate synchronous with demand for cracker lots at the wrapping apparatus.

It should be noted that cracker feed into and cracker discharge from the herein described system is continuous; that the crackers are at different stages of progress in the system; that the handling operations at the several stations are continuous; that cracker flow between stations also is continuous; and that all operations occur concurrently. Of further importance, preceding each of the major handling operations, the crackers are marshaled into orderly formations so that the handling operation may be accomplished accurately and assuredly without the occurrence of cracker jammings or other such mishaps.

The number of crackers picked off and accelerated by the conveyors 425 in each lane 402, and consequently the number of crackers in the staggered lines 502 and the rate of cracker accumulation on conveyor 601, depends upon the relative surface speeds of conveyors 125, 126, 127 and 127a and the ultimate angle of cracker strip shingle achieved thereby. If the difference between the surface speeds of these conveyors is small, the angle of cracker shingle achieved is correspondingly small and cracker strip gathering thereon is rather sparse. Conversely, if the difference between surface speeds of these conveyors is relatively greater, the angle of cracker strip shingle achieved is greater, and cracker gathering is more bunched. Thus, the greater the difference between relative surface speeds, when shingling the cracker strips, the more bunched are the crackers. And, the greater the bunching of the crackers, of course, the more crackers that are picked off, for any given linear measurement of crackers, during the effective travel of each acceleration conveyor 425. On conveyor 601, resultantly, this is reflected in the rate of cracker accumulation thereon.

To prevent too great a cracker backlog or accumulation in the conveyors 601, the surface speeds of the metering conveyors 604, 604a, may require being increased. This is accomplished by varying the output of respective units 678, and, in the herein described embodiment of the invention, this also increases the surface speeds of the conveyors 601 to and in eliminating too great a cracker accumulation. In contrast, cracker accumulation on the conveyors 601 may be stepped up by slowing down metering conveyors 604, 604a, by increasing the bunching of the cracker strips, or by a combination of both. Cracker accumulation in the conveyors 601 thus is a function of both cracker shingling and the surface speed of conveyors 604, 604a.

The surface speeds of the metering conveyors 604, 604a, however, must be such as to permit the desired number of crackers to be picked off and separated into lots 663 by conveyor 665 which feeds into the wrapping apparatus. The number of crackers in each lot 663 therefore is dependent, not only on the metering conveyors 604, 604a, but also upon the availability of the crackers for metering. Without a proper accumulation of crackers on conveyor 601, and more particularly without a continuous available supply of crackers for metering the linear length of crackers (or number of crackers) metered and separated into lots 663 may vary between lots. Therefore, being dependent upon a steady supply of accumulated crackers for proper consistent separation of crackers into lots 663 of like length, cracker separation into lots further is dependent upon proper cracker shingling in order to assure the correct cracker supply.

It further should be borne in mind that the respective speeds of shingling conveyors may be tied to the speed of the oven conveyor. That is, for shingling action as herein described, the shingling conveyors are run at successively slower surface speeds. Still, the speed of the last shingling conveyor must be sufficient to handle the continuous discharge of crackers from the oven. In final analysis, therefore, the surface speeds of all conveyors, between the oven and the wrapper, are intimately tied to the achievement of cracker lots 663 of the desired size.

The wrapper conveyors 665 may be run at a linear speed of 97 feet per minute without difficulty, and thus the cracker counter conveyors 644, 645 also may be run at substantially the same speed. In one preferred mode of operation, the retarding conveyors 604, 604a are run at a speed of approximately 64 feet per minute, or at about two-thirds the speed of the wrapper and cracker counter conveyors, while the accumulation conveyors 601 may be run at a linear speed of about 81.5 feet per minute. The latter speeds are sufficient to cause the desired degree of cracker accumulation and vertical rise on conveyor 601.

To assure a constant supply of crackers to the accumulation conveyor, the acceleration conveyors 425 are run at substantially the same speed, or at 81.5 feet per minute, while the spaced belts 409 are driven at one-sixth this speed or at about 13.6 feet per minute. Conveyors 317, belts 302, and conveyors 201 and 127a also may be driven at a linear speed of about 13.6 feet per minute, while the conveyors 127, 126 and 125, preceding the same may be run at successively slower linear speeds to achieve the desired cracker shingling action.

The present day trend in the packaging of soda crackers is to wrap them in quarter pound lots or tubes, and to pack the tubes in one or two pound boxes. In this manner, the consumer has fresh, crisp crackers down to the last quarter pound, instead of having to immediately unwrap and expose the entire package to air. The herein system, as previously pointed out, has particular application to the transformation of freshly baked bulk crackers to the desired size, and their stacking, counting, and separation into lots preparatory to wrapping. Advantageously, the present system is particularly adaptable for use in such cracker packaging methods. For example, approximately forty-four crackers weigh very close to one-quarter pound. Thus by segregating and wrapping the crackers into lots 663, each containing forty-four crackers, packaging of the crackers into one-quarter, one-half, or one pound packages becomes a simple matter.

By way of illustrating the advantages of the herein cracker handling system, the apparatus in commercial use may effect considerable savings of time and money by increasing apparatus productivity and eliminating hand labor ordinarily required with previously known methods and apparatus for packaging crackers. Using the herein system and described conveyor speeds, one hundred lots 663 of crackers per minute can be set for wrapping at each of the three wrapping machines, or eighteen thousand cracker lots may be wrapped in tubes each hour. At the same time, the crew is reduced to only that which is necessary for quality control and supervision. Moreover, generally the product never need be touched by human hands.

It further is obvious from the foregoing description that the frangible crackers are subjected to a minimum of forces, and that scrap, therefore, is minimal. Also, by maintaining the crackers in controlled lanes throughout their travel, the likelihood of jams is sharply reduced, and consequently the loss of production also correspondingly is sharply reduced.

Attention further is directed to the fact that the aforedescribed system requires only conveyor speed controls to regulate the output at the several cracker handling stations, as well as that of the entire system. Any of the well-known conveyor speed controls may be employed. Besides rotating cam 425, no other supervisory timing and regulating mechanisms are necessary, nor are there any other reciprocating or intricate parts or timed mechanisms, the elimination of which contributes greatly both to the accuracy and over-all speed of operation.

It is to be distinctly understood that the apparatus

We claim:

1. Apparatus for transforming a group of equivalent individual lines of panels, such as crackers, moving at a given speed along respective paths into a single common line moving at a sufficiently greater speed to accommodate the panel movement in all individual lines, comprising a plurality of conveyor means, each juxtaposed to a respective one of said paths, driven at a speed greater than panel line advance therein, and normally having no effect on the panels in its respective path; mechanism for each panel line path whereby the conveyor means juxtaposed thereto intermittently is disposed to intercept a foremost length of panels therein and move the same at said greater speed; means for sequentially actuating the mechanisms for said paths, whereby lengths of panels are sequentially picked off from said paths, accelerated to said greater speed and delivered from said paths in staggered relation; and means for receiving said staggered lengths of panels and directing the same into a single line.

2. Apparatus for transforming a group of equivalent moving rows of panels, such as crackers, into a single moving line, comprising two conveyor means for each panel row, one arranged to receive its respective panel row and advance the same along a predetermined path at a normal speed, the other juxtaposed to said path, driven at a speed greater than the normal travel of panels therein, and normally having no effect on the panels in said path, means for each panel path whereby said other conveyor means intermittently is disposed into said path to intercept a foremost length of panels therein and move the same at said greater speed, means for sequentially actuating the means for disposing the other conveyor means into the paths of said panel rows, whereby lengths of panels are sequentially picked off from said rows, accelerated and delivered forth in staggered relation to each other, and means for integrating the staggered lengths of panels into a single line.

3. Apparatus for consolidating equivalent rows of advancing panels, such as crackers, into a lesser number of panel highways, each highway comprising means whereby the panel rows therein are advanced along respective predetermined paths, conveyor means for each path, said conveyor means being driven at a speed faster than panel row advance in its respective path and normally having no effect on the panels therein, mechanism for each path whereby the respective conveyor means therefor intermittently is effective to intercept a foremost length of panels from the row thereof in its respective path and move the same at said faster speed; further means for each highway for sequentially actuating the mechanisms of the paths therein so that lengths of panels are sequentially picked off in the respective highway paths, accelerated to said faster speed and delivered from said respective highway paths as staggered lengths of panels; and still further means for each highway for receiving the staggered lengths of panels and directing the same into a single consolidated line and towards a destination.

4. The apparatus described in claim 3 wherein the still further means for each highway additionally includes a positionable guide to alternatively maintain its consolidated line of panel lengths therein to direct the same towards the respective highway destination, or to divert the panel lengths towards the destination of a highway adjacent thereto, and means mounting said guide for selective positioning.

5. The apparatus described in claim 3 wherein the independent panels are arranged in shingled formation in their respective rows, and additionally including for each panel row path a nozzle thereabove and arranged to direct a jet of air against the last panels of the lengths thereof to maintain the same in correct shingled position during acceleration.

6. In apparatus for assembling a plurality of independent columns of tablet-like articles, such as crackers or the like, into single line formation, means for continuously advancing said article columns in control lanes each having parallel means separated by a space for supporting an article column thereon, a plurality of conveyors running at a speed faster than the advance of said columns, one below each lane and the column therein, and normally having no effect on the same, means for intermittently independently elevating each conveyor to a position effective to pick off a predetermined length from the leading portion of the article column thereabove and convey the predetermined length of articles at said accelerated rate, means for actuating said conveyor elevating means to effect sequential transfer of the predetermined lengths of articles from said lanes to said conveyors, the latter means including timing means whereby each length of articles is picked off and accelerated only after the end of the immediately preceding length of articles is positioned to clear a predetermined line prior to the front of said next accelerated length of articles clearing said line, and means for sequentially receiving said predetermined lengths of articles and diverting the same into a single line.

7. Apparatus described in claim 6, wherein said articles are arranged in shingled condition, and additionally including a plurality of nozzles, each positioned above the lane of travel of a respective one of said article columns and arranged to direct a jet of air against the last of said articles in each accelerated length thereof to maintain the same in correct shingled condition.

8. Apparatus as described in claim 6 and additionally including at each column lane an elongated arm pivotally supported at one end and arranged to rest upon said lengths of articles to maintain the same correctly oriented during initial acceleration thereof.

9. Apparatus for automatically rearranging tablet-like articles, such as crackers and the like, from a plurality of preliminary rows into a single final row, comprising: paired conveyor means for each preliminary row, one arranged to receive the articles of its respective preliminary row and advance the same along a predetermined path at a normal speed, the other juxtaposed to said path, driven at a speed greater than the normal travel of articles therein, and normally having no effect on the articles in said path; means for each article path whereby said other conveyor means is positionable into the plane of article travel in said path to intercept a foremost section of articles therein and move the same at said greater speed toward the final row; means for intermittently actuating the means for positioning the other conveyor means into the paths of said preliminary rows in succession, whereby sections of articles are picked off from said preliminary rows in succession, accelerated to said greater speed toward the final row as a succession of separated groups of articles, and means for combining the said succession of groups into the said final row.

10. Apparatus as described in claim 9 wherein at each preliminary row (a) the other conveyor means normally is positioned below said one conveyor means, (b) the means for positioning said other conveyor means includes a vertically reciprocable track, and (c) the actuating means includes a fluid operated cylinder for achieving rapid positioning of said track.

11. The apparatus described in claim 9 wherein said one conveyor means at each article path includes paired parallel running and spaced endless belts, and said other conveyor means includes an endless conveyor below the space between said belts, elevatable between said parallel belts, and having means thereon for lifting a foremost article section from said paired belts to move said article section at said greater speed.

12. Apparatus for handling and conveying tablet-like articles, such as crackers, and reassembling the same from a plurality of article columns to a lesser given number of consolidated rows, comprising: a given number of highways, each highway including means whereby a number of article columns are advanced along a corresponding number of predetermined paths; conveyor means for each path in each highway, said conveyor means being driven at a speed faster than article column advance in its respective path and normally having no effect on the articles therein; mechanism for each path whereby the respective conveyor means therefor intermittently is made effective to intercept a foremost length of articles in its respective path and move the same at said faster speed; further means for each highway for sequentially actuating the mechanisms of the paths therein so that lengths of articles are sequentially picked off in the respective highway paths, accelerated and moved in their respective highways as staggered lengths of articles, said further means including timing means whereby each length of articles is picked off and accelerated only after the end of the immediately preceding length of articles in its respective highway is positioned to clear a predetermined line prior to the front of said next accelerated length of articles clearing said line; and still further means for each highway for receiving the staggered lengths of articles and diverting the same into single line relationship.

13. In apparatus wherein means are provided for continuously advancing a given number of continuous progressions of cracker panel rows along parallel paths, the improvement which resides in combining said latter means with means whereby foremost lengths of cracker panels in the progression thereof sequentially are picked off, accelerated and separated from their respective cracker panel progressions, the latter means including timing means whereby each length of cracker panels is picked off and accelerated only after the end of the immediately preceding length of cracker panels is positioned to clear a predetermined line prior to the front of said next accelerated length of cracker panels clearing said line, and means whereby the separated lengths of cracker panels are guided into a consolidated row.

14. Apparatus for processing bakery goods which comprise a continuous supply of articles of the class including crackers, comprising means defining a number of single-line approach lanes succeeded by a single-line common lane, means for continuously advancing lines of the articles respectively along the approach lanes toward the common lane, and merging apparatus for merging the lines in the approach lanes into a single line moving at a higher rate of speed in the common lane than in any approach lane, the merging apparatus comprising means, acting for the approach lanes in succession only, to accelerate and move a group of the leading articles of any such lane forwardly away from the following articles in the same lane and into the common lane to form a segment of a single common line of articles therein, the merging means further including means for causing the articles moved into the common lane to comprise a single unbroken line moving at a rate of speed in excess of the speed of line movement in any approach lane.

15. In an apparatus according to claim 14, wherein all said lanes are generally horizontally disposed, and wherein the said articles therein comprise panel-like articles at least loosely stacked on edge with intermediate articles of any said line thereof being supported in its said on-edge stacked condition by an adjacent article, auxiliary support means included in said merging apparatus for insuring that the articles of each said group of articles moved from any said approach lane into the said common lane to join the trailing end of the said single line of articles therein joins such single line with the articles at the point of juncture being in the said on-edge stacked condition.

16. Apparatus for separating a continuous progression of crackers into lots of the desired size, comprising: a continuously moving conveyor for carrying said crackers stacked on edge; means metering cracker advance with said conveyor including paired side running conveyors, positioned one on each side of said conveyor and between which said crackers pass while having their vertical engaged thereby; means for receiving the metered crackers from said conveyor, and a second pair of side running conveyors, each having a number of spaced flights thereon synchronized to the flights on the other of said second pair of side running conveyors, and arranged to pick off a measured length of metered crackers in each flight, accelerate and direct the same towards a destination; and means for driving said metering conveyors in synchronism and in accordance with the demand for crackers by said second pair of side running conveyors.

17. Apparatus for separating a continuous column of cracker panels into stacked groups of measured size, comprising: means for advancing a continuous supply of stacked crackers standing on edge; a first continuously running conveyor juxtaposed to said advancing means, having a number of spaced flights thereon, and arranged to pick off and segregate in each flight a given length of stacked crackers and move the same towards a destination; a second continuously running conveyor carrying crackers to said advancing means; means metering cracker advance with said second conveyor, including continuously moving endless surfaces positioned one at each side of said second conveyor and spaced to engage the vertical edges of crackers passing therebetween; means for driving said endless surfaces at that lineal speed sufficient to permit cracker passage to and advance on said advancing means at a rate consistent with the demand for crackers by said first conveyor, whereby segregated uniform lengths of stacked crackers are achieved.

18. The apparatus described in claim 17 wherein the latter means includes means for advancing a number in excess of one of spaced rows of shingled crackers in a corresponding number of lanes, there being one cracker row in each lane; means for feeding a constant supply of shingled cracker rows to said advancing means therefor; means whereby foremost groups of shingled crackers in said lanes sequentially are picked off, accelerated and separated from their respective cracker rows, the latter means including timing means whereby each succeeding group of crackers is picked off and accelerated after the end of the immediately preceding accelerated cracker group is positioned to clear a predetermined line prior to the front of said succeeding group of crackers clearing said line; and means for receiving the separated group of shingled crackers and guiding them into a consolidated column and towards said second conveyor.

19. The apparatus described in claim 18 wherein the feed of said groups of shingled crackers to said second conveyor is sufficient to cause said shingled crackers to accumulate and stand on edge on said second conveyor under the retarding influence of said metering means, and thereby provide a reservoir of properly positioned crackers prepared for feed to said first conveyor.

20. Apparatus for compactly assembling in stacked formation a continuous supply of panel-like articles of bakery goods of the class including crackers, which comprises principal conveyor means for continuously moving a line of the articles generally horizontally, means for continuously placing the articles on the principal conveyor means in overlapping, or shingled, relation to provide a moving line of shingled articles carried forward by the principal conveyor means, auxiliary conveyor means for yieldingly grasping opposed sides of the shingled articles within a section of the moving line and for moving the grasped articles at a slower speed than that of the following articles in the shingled line, and retard means, located further along the said line than the auxiliary conveyor means, for applying a yielding retarding force to the movement of the articles by the auxiliary conveyor means sufficient to cause the line of articles discharged by the auxiliary conveyor means to have become compactly stacked by individual turning of the articles to place their thickness dimension longitudinal to the direction of line movement.

21. Apparatus for separating a continuous progression of panels, resting on edge, into lots of a predetermined number, said apparatus comprising a continuous conveyor for advancing said progression of panels for movement therefrom, means for retarding said panels as they advance on said conveyor, said retarding means being located adjacent said conveyor and being operable on said panels prior to the departure of said panels from said conveyor, means for receiving said retarded panels as they move from the conveyor, means for picking off and conveying a predetermined number of said received panels, and means for operating said pick-off means at a speed greater than the speed of said conveyor.

22. An apparatus as recited in claim 21 wherein said retarding means comprises a pair of metering conveyors each positioned on a respective side of said advancing conveyor, means on each of said metering conveyors for engaging a respective side edge of an advancing panel, and means for operating said metering conveyors at a speed less than the speed of the advancing conveyor.

23. An apparatus as recited in claim 21 wherein said pick-off means comprises a pair of endless conveyors each positioned on a respective side of said receiving means, and a pair of synchronized lugs each on a respective conveyor, each of said endless conveyors having a run portion in which its lug extends into the path of said moving progression of panels to pick off a predetermined number of said panels.

24. An apparatus as recited in claim 21 and comprising an additional conveyor in alignment with said receiving means, means on said additional conveyor for engaging the front panel of a picked-off lot of panels, means on the additional conveyor for engaging the last panel of said picked-off lot of panels in timed relation to the release of said panel by said pick-off means, and means for operating said additional conveyor at the same speed as said pick-off means.

25. An apparatus for metering and retarding a progression of crackers resting on edge, said apparatus comprising a continuous conveyor for advancing said progression of crackers, a pair of metering conveyors each positioned on a respective side of said advancing conveyor, means on each of said metering conveyors for engaging a respective side edge of an advancing cracker, and means for operating said metering conveyors at a speed less than the speed of the advancing conveyor.

26. An apparatus as recited in claim 25 and further comprising means for aligning the top edges of said crackers prior to said advance thereof between said metering conveyors.

27. An apparatus as recited in claim 26 wherein said aligning means comprises a tamping plate situated above said advancing conveyor, means mounting said tamping plate for cyclic movement towards and away from said advancing conveyor, and means for imparting said movement to said plate.

28. An apparatus as recited in claim 25 wherein said cracker-engaging means comprises a pair of soft padded portions arranged to engage said cracker side edge therebetween.

29. Apparatus for picking off a predetermined number of crackers from a progression of advancing crackers, said apparatus comprising means for receiving said progression of advancing crackers, a pair of endless conveyors each positioned on a respective side of said receiving means, a pair of synchronized lugs each on a respective conveyor, each conveyor having a run portion in which its lug extends into the path of said advancing progression of crackers to pick-off a predetermined number of said crackers, and means for moving said endless conveyors at a speed greater than the speed of the advancing progression of crackers.

30. An apparatus as recited in claim 29 wherein each endless conveyor comprises a first run portion situated adjacent said receiving means, a second run portion connected to said first run portion and diverging from the receiving means, and a third run portion extending between said second and first run portions, said apparatus further comprising means mounting each conveyor for movement between a first position in which the first run portion is substantially parallel with said receiving means and a second position in which the first run portion extends angularly to the receiving means, and means for moving each conveyor to its first position in timed relation to the movement of a respective lug to the beginning of said first run portion.

31. An apparatus are recited in claim 30 and comprising an additional conveyor in alignment with said receiving means, and means on said additional conveyor for engaging the last cracker of a picked-off number of crackers in timed relation to the movement of said lug to the end of said first run portion.

32. An apparatus as recited in claim 29 and comprising a pair of brushes each arranged on an opposite side of said receiving means and each including means for engaging the adjacent edge of a cracker advancing on said receiving means to maintain said cracker in a desired aligned position.

33. An apparatus as recited in claim 29 and comprising a plurality of air jet nozzles positioned on opposite sides of said receiving means and adjacent thereto, said nozzles being directed toward said receiving means to facilitate positioning of said crackers advancing on the receiving means.

References Cited in the file of this patent

UNITED STATES PATENTS

| | | |
|---|---|---|
| 2,691,922 | Pearce | Oct. 19, 1954 |
| 2,712,141 | Sieb | July 5, 1955 |
| 2,858,007 | McCain | Oct. 28, 1958 |

UNITED STATES PATENT OFFICE
CERTIFICATE OF CORRECTION

Patent No. 3,071,236                                     January 1, 1963

James H. Hahn et al.

It is hereby certified that error appears in the above numbered patent requiring correction and that the said Letters Patent should read as corrected below.

In the grant, lines 2 and 3, and line 13, for "Schulze and Birch Biscuit Co.", each occurrence, read -- Schulze and Burch Biscuit Co. --; column 2, line 33, for "objects" read -- object --; column 3, line 63, for "hecond" read -- second --; line 70, for "alingned" read -- aligned --; column 7, line 39, for "trailings" read -- tailings --; column 24, line 5, after "vertical" insert -- edges --; column 26, line 34, for "are" read -- as --.

Signed and sealed this 24th day of September 1963.

(SEAL)
Attest:

ERNEST W. SWIDER                                      DAVID L. LADD
Attesting Officer                                         Commissioner of Patents

Notice of Adverse Decision in Interference

In Interference No. 94,854 involving Patent No. 3,071,236, J. H. Hahn and R. J. Nadherny, ARTICLE CONVEYING, SEPARATING, AND STACKING APPARATUS, final judgment adverse to the patentees was rendered Mar. 2, 1966, as to claims 1, 2, 3, 6, 9, 11, 12, 13, 14, 15, 26 and 27.
[*Official Gazette May 17, 1966.*]